United States Patent
Lavalley et al.

(10) Patent No.: US 11,247,738 B2
(45) Date of Patent: Feb. 15, 2022

(54) LEGGED HIGH-DEXTERITY SELF-BALANCING CAPABLE ROBOT ACTOR

(71) Applicant: DISNEY ENTERPRISES, INC., Burbank, CA (US)

(72) Inventors: Scott Christopher Lavalley, Santa Clarita, CA (US); Kyle Robert Thompson, Glendale, CA (US); Michael Anthony Hopkins, Pasadena, CA (US); Dexter J. Dickinson, Tujunga, CA (US); Jared Edward Bishop, Ventura, CA (US); Jerry W. Rees, Glendale, CA (US); Kyle Michael Cesare, Burbank, CA (US)

( * ) Notice: Subject to any disclaimer, the term of this patent is extended or adjusted under 35 U.S.C. 154(b) by 490 days.

(21) Appl. No.: 16/421,742

(22) Filed: May 24, 2019

(65) Prior Publication Data
US 2020/0369333 A1  Nov. 26, 2020

(51) Int. Cl.
*G06F 17/00* (2019.01)
*B62D 57/032* (2006.01)
*B25J 11/00* (2006.01)

(52) U.S. Cl.
CPC ......... *B62D 57/032* (2013.01); *B25J 11/0015* (2013.01); *B25J 11/0035* (2013.01)

(58) Field of Classification Search
CPC . B62D 57/032; B25J 11/0015; B25J 11/0035; B25J 11/0005; B25J 11/003
USPC ....................................................... 700/245
See application file for complete search history.

(56) References Cited

U.S. PATENT DOCUMENTS

| | | | | |
|---|---|---|---|---|
| 6,160,986 A * | 12/2000 | Gabai | ...................... | G09B 5/04 434/307 R |
| 7,065,490 B1 * | 6/2006 | Asano | ................... | G10L 13/033 318/568.12 |
| 8,909,370 B2 * | 12/2014 | Stiehl | ..................... | B25J 13/081 700/245 |
| 9,519,989 B2 * | 12/2016 | Perez | ...................... | A63F 13/42 |
| 10,242,666 B2 * | 3/2019 | Monceaux | .............. | G10L 15/22 |
| 10,334,158 B2 * | 6/2019 | Gove | .................. | G06F 3/04883 |
| 2004/0034449 A1 * | 2/2004 | Yokono | .................. | B25J 9/1633 700/245 |
| 2006/0241718 A1 * | 10/2006 | Tyler | ........................ | A61B 5/11 607/45 |
| 2020/0014848 A1 * | 1/2020 | Gove | ..................... | G01B 11/00 |

* cited by examiner

*Primary Examiner* — Ronnie M Mancho
(74) *Attorney, Agent, or Firm* — Snell & Wilmer L.L.P.; Kent A. Lembke

(57) ABSTRACT

A robot actor, or character mobility hardware platform, adapted to unleash or provide a wide variety of characters in the physical world. The robot actor enables the often screen-constrained characters to become life-like, interactive participants with nearby people in ways not presently achievable. The robot actor is an untethered, free-roaming robot that is has two (or more) legs, is adapted for high dexterity, is controlled and designed to be self-balancing, and, due to this combination of characteristics, the robot can provide characters with an illusion of life and, in many cases, in correct proportion and scale. The hardware and software of the robot actor will become a new generation of animatronic figures by providing a hardware platform capable of continuously evolving to become more capable through advances in controls and artificial intelligence (AI).

35 Claims, 25 Drawing Sheets

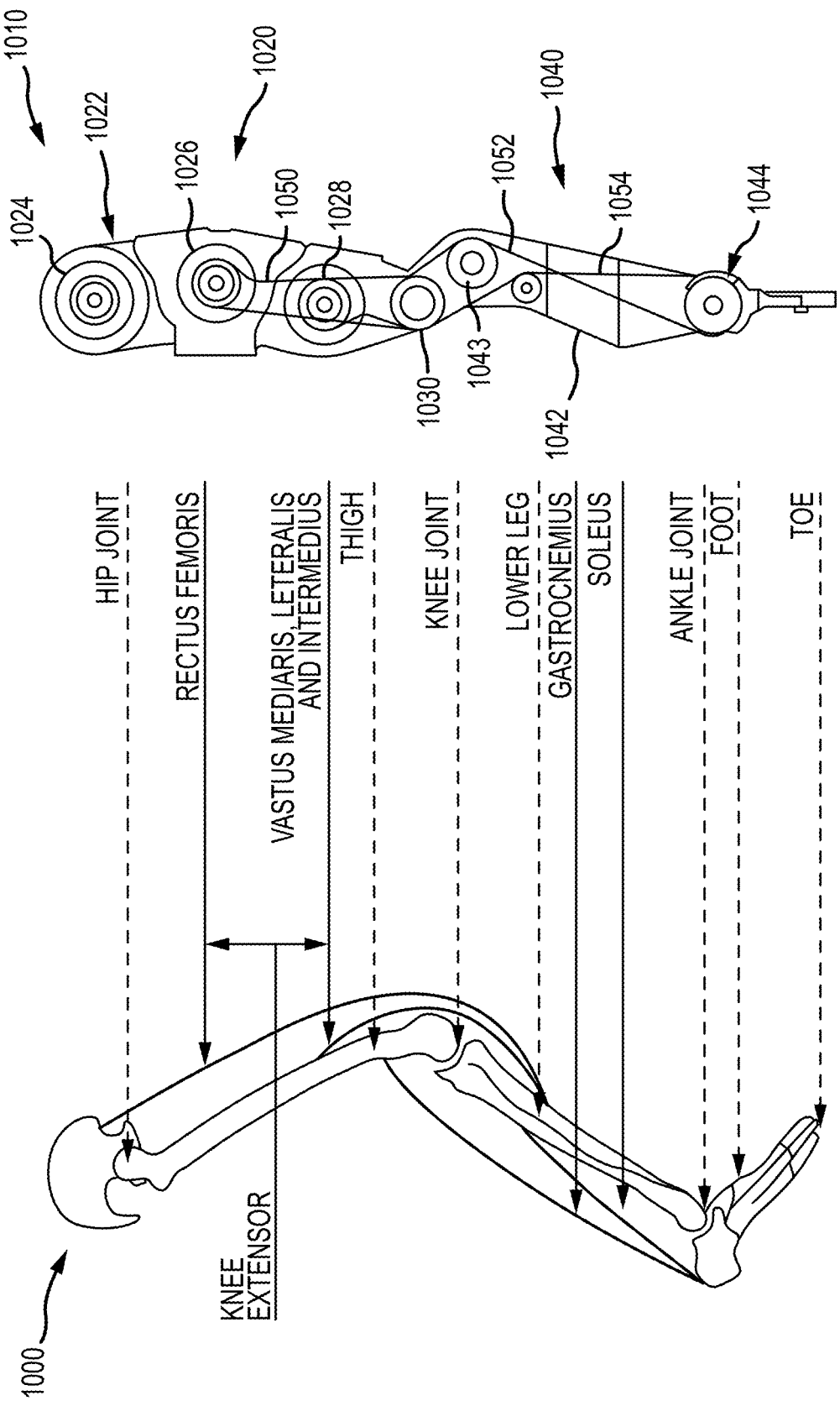

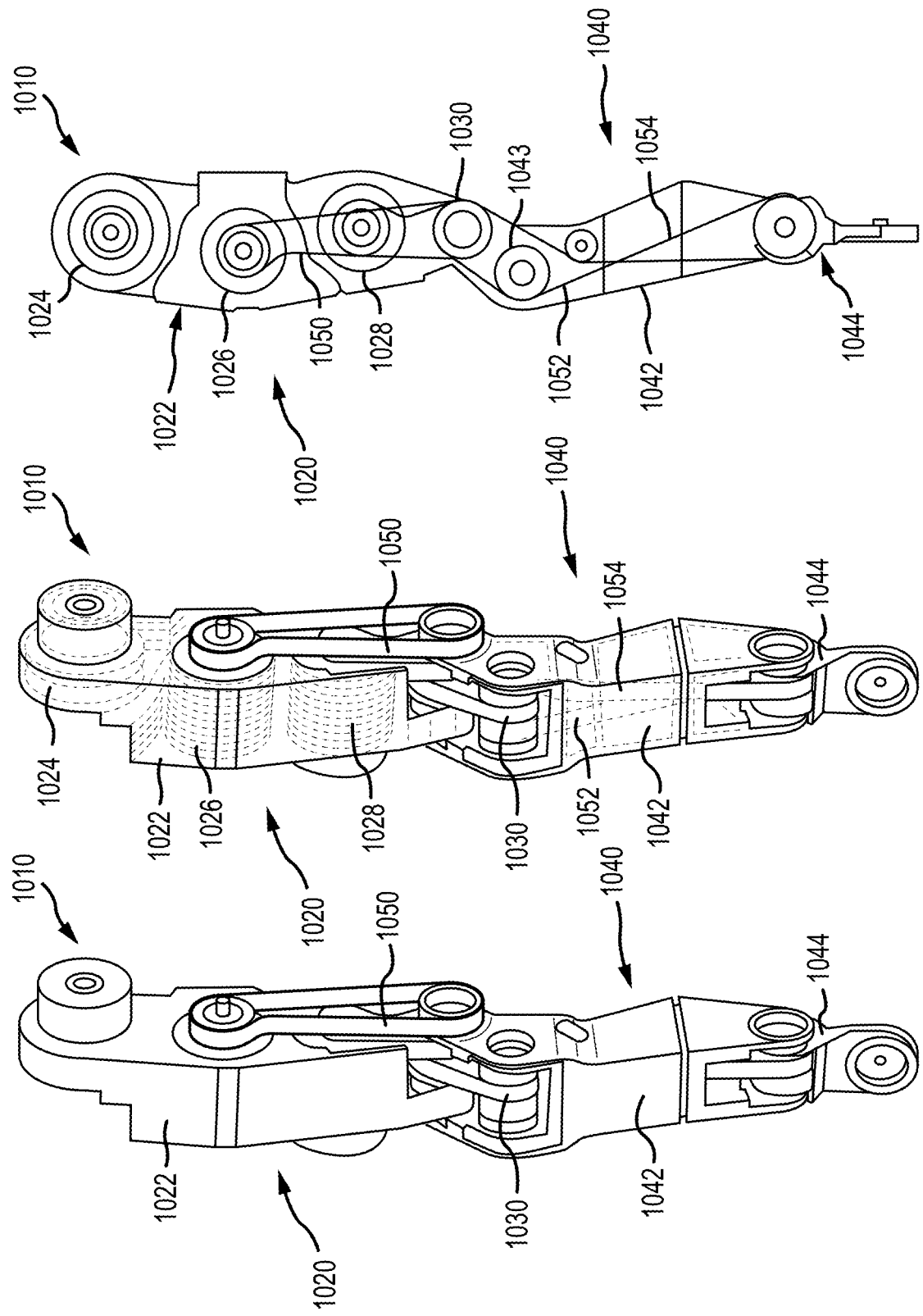

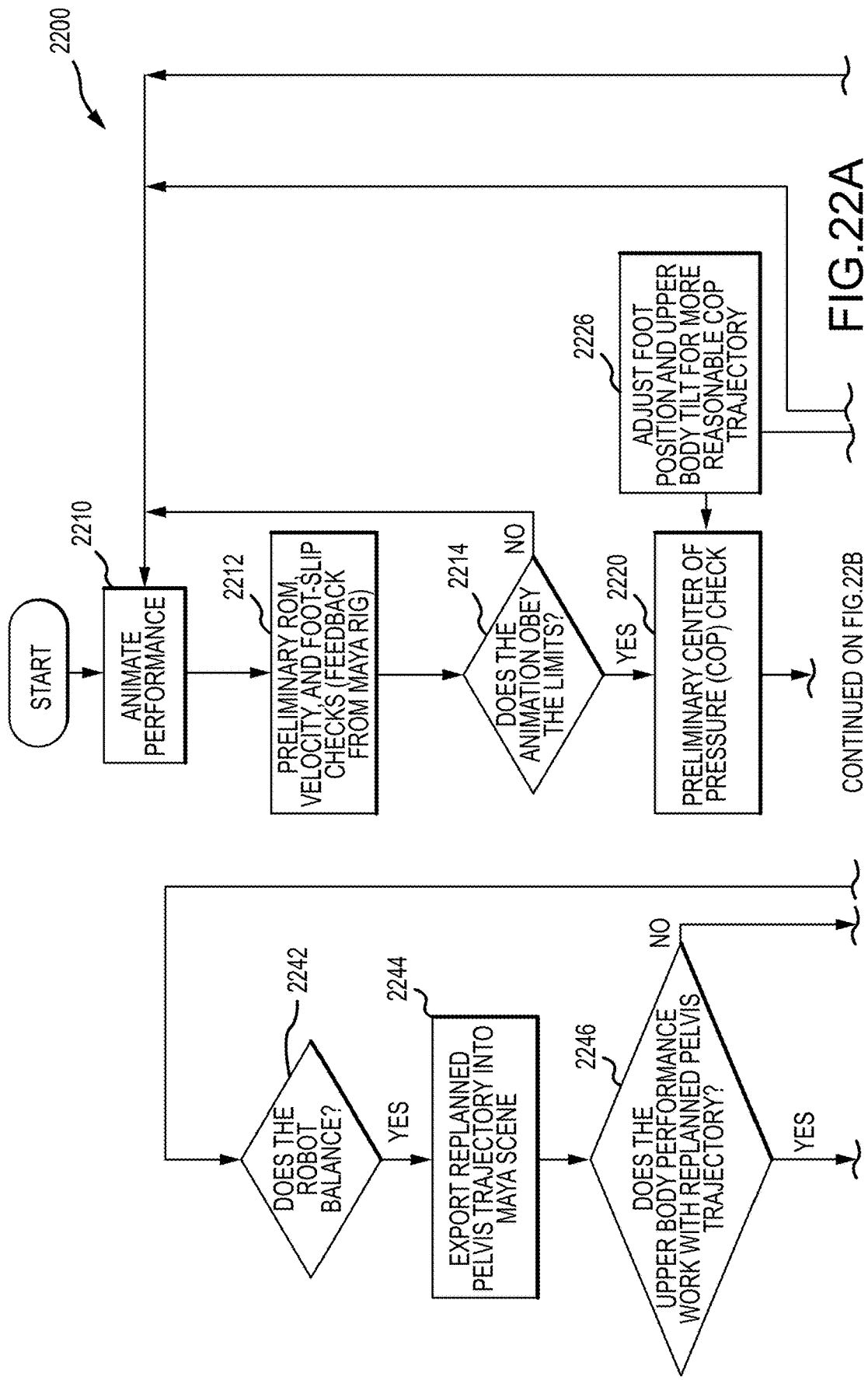

LEGGED HIGH-DEXTERITY SELF-BALANCING CAPABLE ROBOT ACTOR

BACKGROUND

1. Field of the Description

The present description relates, in general, to design and control of high dexterity, self-balancing, legged robots, and, more particularly, to a robot (and a system and a method of designing such a robot) that is adapted to operate as a robotic actor capable of performing as one or more characters so as to provide the illusion of life by displaying that individual character's unique attitudes and story-consistent emotions via audio, facial expression, and recognizable body language. The "robot" with this design may also be considered "a character mobility hardware platform."

2. Relevant Background

There are many applications and environments where it is desirable to provide a physical character from a book, a movie, a video game, or a television show. For example, many venues may wish to entertain visitors by having the characters interact with visitors or by having the characters put on a show. Often, these characters are too small, too uniquely proportioned, and too delicately detailed for any costumed actor to portray without breaking the reality of the experience for visitors. As technology increasingly brings higher quality to entertainment experiences, visitors increasingly expect characters to have the same degree of authenticity in scale, look, and nuance of behavior, whether experienced in movie space, game space, virtual space, augmented space or physical space or whether experienced across multiples of these spaces in the course of one larger interconnected adventure. For characters that are smaller than humans, costumed actors are the weakest link.

In the entertainment industry, there is a massive number of characters including fanciful ones from animation-based and CGI-based media as well as comic books and the like, and many of these characters have scale, appearance, and behavior characteristics that make it impossible to be accurately performed by an actor in a costume. For many years, many of these characters have been constrained to the screen as the challenges of providing them authentically have been too difficult to overcome. In other cases, the characters have been provided for short "drive-by" experiences by using robots or other robotic devices (or animatronics) with a fixed base attached to the ground such that walking and other movements were not possible. However, these methods of providing limited versions of characters for short experiences are not compatible with new A.I.-driven experiences that keep characters on display for extended periods of time during which non-linear, in-character improvisation is required.

As the entertainment industry (and, indeed, the world) enters an A.I. era, there are new expectations for engagement between visitors and physically realized characters. Short, pre-scripted performances of the past will be replaced by longer, interactive performances that prove the character perceives the visitor in the moment and is reacting to the visitor in real time. Since these longer performances will necessarily be subject to more scrutiny by visitors, they must be of a higher quality than older, short encounters, including the ability for the robot actor to improvise autonomously via A.I. while staying authentically "in character." This A.I.-assisted autonomy of behavior includes emotional aspects as well as physical aspects such as walking among or beside visitors, human actors, and other robot actors while displaying appropriate attitudes. Multiple robot actors may be deployed to perform the same iconic character for many different visitor groups simultaneously, giving each visitor group custom interaction and rapport as well as authentic character scale, appearance, and behavior. This scalable platform approach will replace "one-off" methods. Although real-world physics will prevent these characters from replicating all the unconstrained stunts their movie and game counterparts perform, the remaining bounds of attainable acting will be engineered, authored, and deployed to achieve a rich illusion of life and authentic individuality of character. In fact, scenarios may easily be designed to give visitors VR time with a character that is unconstrained by real-world physics, for example during a battle, then as the VR time ends sync the physical robot to keep the same character alive as goggles come off and a post-battle chat ensues. For the visitor, the character has remained a believable companion across VR space and real-world space with no perceivable break in size, appearance, and behavior.

Hence, there remains a demand for new techniques of providing a physical device that can provide one or more characters that demonstrate uniquely individual behaviors, including expression and body language that observers expect from those characters.

SUMMARY

To address these and other needs, the inventors have designed a robot actor (or character mobility hardware platform) that is adapted to unleash or provide a wide variety of characters in the physical world. The robot disclosed herein is sometimes referred to as a "capable robot" meaning that it can be configured to perform multiple disparate characters and roles and that it can perform these characters with sufficient fidelity that an observer's attention is directed increasingly on the illusion of a living character and decreasingly on the reality of an actor portraying the character. The robot actor enables the often screen-constrained characters to become life-like, interactive participants with nearby people in ways not presently achievable.

In contrast, the new robot actor is an untethered, free-roaming robot that is has two (or more) legs, is adapted for high dexterity, is controlled and designed to be self-balancing, and, due to this combination of characteristics, the robot actor can portray a variety of characters in correct proportion and scale. The hardware and software of the robot actor will become a new generation of animatronic figures by providing a hardware platform capable of continuously evolving to become more capable through advances in controls and artificial intelligence (AI).

In some embodiments, a robot is provided for bringing characters to life in the physical world. The robot includes movable components (e.g., limbs, a head, and the like) driven by actuators such as motors, linkages, artificial muscles, pneumatics/hydraulics, and the like. The robot also includes processing resources that represent a set of character-specific gestures and a set of show-specific movements for each of a plurality of moods or emotions. The robot also includes a controller that may execute procedural code, instantiate software objects, and/or implement one or more artificial intelligence (AI) agent(s) located onboard the robot and coupled to provide signals to the actuators to implement the gestures and movements. The robot is untethered and free-ranging in a physical space. During operations, the controller determines, in real time, a present mood or emotion associated with the character being portrayed by the robot, and the controller selects one or more gestures from the sets of gestures and/or one or more of the movements from the sets of movements based on the present mood or emotion and the show-specific action to be portrayed by the character. Further, the controller operates a set of actuators to operate the movable components using the selected one of the sets of gestures or the sets of movements, whereby the robot is operated to provide an illusion of life.

In some cases, the robot further includes sensors for sensing input from the physical space. The controller processes the input from the physical space to determine the present mood or emotion. In the same or other cases, the controller operates the sets of actuators by sequentially selecting, in real time, differing ones of the sets of gestures or the sets of movements to provide motion synthesis that retains a balance of the robot in the physical space. Then, the controller generates, in real time and without external input, transitional movements and control signals for the set of actuators between each sequential pair of the sets of gestures or the sets of movements.

In some implementations, the movable components comprise two or more legs each comprising an upper leg housing and a lower leg housing coupled via a knee joint. The upper leg housing includes sidewalls defining a hollow interior space, and channels are provided in the upper leg housing for receiving two or more of the actuators. The sidewalls include air inlets for drawing air into the hollow interior space and air outlets for exhausting air out of the hollow interior space. A stack of spaced apart metal fins are positioned within the hollow interior space that are coupled to sidewalls defining the channels and that define air plenums for air between the air inlets and the air outlets. The sidewalls defining the channels each may provide a housing for one of the actuators received in the upper leg housing to significantly enhance heat transfer.

In some embodiments, the movable components are two or more legs each including an upper leg housing and a lower leg housing coupled via a knee joint. The upper leg housing includes sidewalls defining a hollow interior space, and channels are provided in the upper leg housing for receiving two or more of the actuators including an ankle pitch actuator. Then, significantly, two belts are provided that extend from the upper leg housing and the ankle pitch actuator over a pulley in the lower leg housing with a configuration that transmits torque of the ankle pitch actuator across the knee joint to provide assistive torque during stance using reversed gastrocnemius. In this or other embodiments, the actuators each includes a clutch acting as a self-resetting mechanical fuse when transient torques exceed actuator component limits to handle impact events.

BRIEF DESCRIPTION OF THE DRAWINGS

FIGS. 10A and 10B illustrate, respectively, a human leg showing human gastrocnemius muscle routing and a robot leg showing use of drive belts to provide reversed gastrocnemius via belts and pulleys;

FIGS. 11A-11C provide further detail of the robot leg of FIG. 10B with an isometric view, a transparent isometric view, and a transparent side view (opposite side as shown in FIG. 10B);

FIGS. 22A and 22B illustrate a flow diagram of an animation (or script generation) method for a robot actor.

DETAILED DESCRIPTION OF THE PREFERRED EMBODIMENTS

Figure 1:
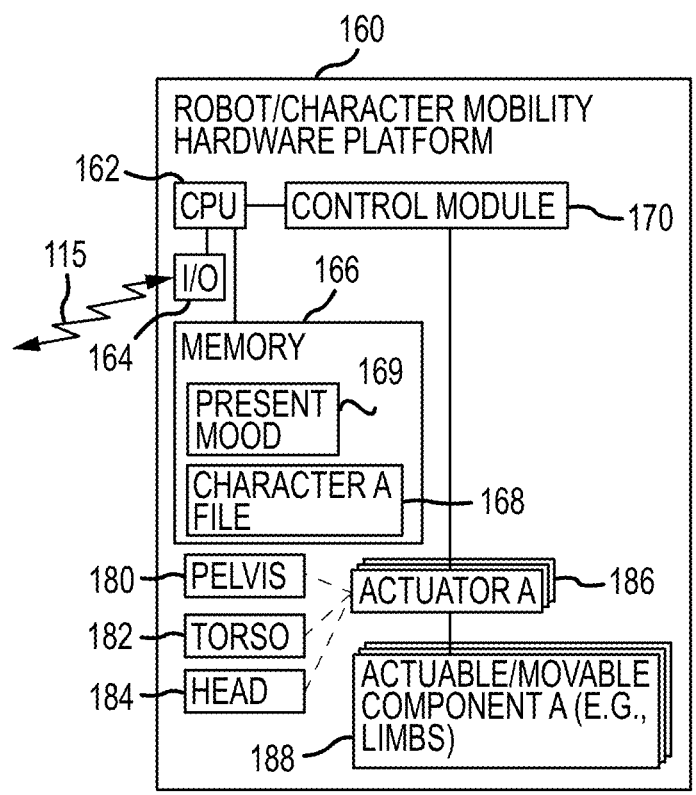
FIG. 1 is a functional block diagram of robot actor design system of the present description.

Briefly, a new robot design is presented, along with a design system and method for creating the robot design, to allow robots or character mobility hardware platforms (or "robot actors" or simply "robot") to be fabricated and operated to portray characters in a manner that can be perceived as being alive. In some preferred embodiments, the robot actor is configured to "act" and move like a particular character would with similar body language and with similar movements (e.g., a particular gait, pace, dexterity, gestures, stance, posture, and so on). To this end, the robot actor may include hardware and software components so that it has one or more of the following attributes: highly dexterous, self-balancing, untethered, free roaming, and expressive. The robot disclosed herein is sometimes referred to as a "capable robot actor" meaning that it can be configured to perform multiple disparate characters and roles and that it can perform those characters with sufficient fidelity that an observer's attention is directed increasingly on the illusion of a living character and decreasingly on the reality of an actor portraying the character.

The robot actor operates in context of a live performance entertainment event. Generally speaking, an entertainment event is similar to theatrical performances where a story is told through words and actions performed by an actor. The event mixes script following with ad hoc and interactive components to achieve desired storytelling results. Additionally, actors portray characters in a manner that demonstrates identifiable characteristics of the character. When successful, those characteristics emphasize an illusion that the character is participating in the story rather than an actor portraying a character. In light of this, the entertainment event includes a mix of scripted components, some of which can be implemented non-procedurally by executing a script as well as procedural components that can be implemented using artificial intelligence and machine learning technology and/or using hand-crafted parameterized trajectories.

The robot actor preferably is a generic platform capable of adapting to a variety of physically compatible characters. A portable character model, which may include one or more data files, represents the identifiable characteristics of a particular character being portrayed. A performance plan that represents story-oriented and perception-influenced motions that describe what the character is going to do is also ported to the robot actor. As a conceptual model, the performance plan represents what the character is to perform and the portable character model represents how the character is to perform. What a robot actor is to perform may be labeled as an "action" or a "behavior," and how the robot actor is to perform may be labeled a "style" or "motion" (e.g., wave (i.e., an action) angrily (i.e., style)). Together, these components transform the generic platform into an actor capable of portraying a specific character.

As an overview of the concepts described herein (and to provide a frame of reference), FIG. 1 is a functional block diagram of a robot or character mobility hardware platform 160 that can be operated and/or controlled as described herein. For example, show authoring would be where a "director" would author the movements and emotions of a character's story. Then, the movements and emotions (and artistic characteristics) are loaded into an already existing robot (platform 160, for example) as shown in a wired or wireless manner with arrows 115. After loading, the robot becomes an actor with the data and pseudo-intelligence to perform a role that tells the director's story through motion and emotion. This data may be a script, instructions, or ode that is executed in a procedural fashion. It likely also includes data that instantiates one or more times.

The robot or, more generally, character mobility hardware platform 160 may take a wide variety of forms to practice the present invention. Generally, as, shown, the robot 160 will include a pelvis 180, a torso 182, and a head 184, but these are not required. Further, the robot 160 will include a plurality of actuators (or drivers) 186 that are selectively operated by a control module 170 to actuate or drive one or more actuable/movable components 188 such as two or more limbs with (or without) feet, two (or more) arms with (or without) hands, and so on. Examples below show control techniques for a two-legged robot, but this is not a limitation as the concepts are equally applicable to other movable components of a robot or character mobility hardware platform 160.

The robot 160 includes a processor(s) 162 managing operations of I/O devices 164, which are used at least to receive communications such as from a design station, which may be an ordinary PC workstation, laptop, or the like using software tools described in following paragraphs. Particularly, the robot 160 also includes memory/data storage devices 166 for storing a character file (or portable character model) 168 received from the designer's workstation such as all or portions of one of the character files/records. This character file 168 sets which of a plurality of characters the robot 160 will operate to bring to life or to act like during its operations.

The processor 162 runs software and/or executes code/instructions (e.g., in memory 166) to provide the functionality of a control module 170. The control module 170 (as discussed below) may be configured to provide include one or more AI components and to otherwise adapt to current conditions for the robot 160. For example, the control module 170 may operate to determine a present mood 169 of the robot actor 160 (such as afraid, sad, or happy based on input from sensors or other I/O components 164), and the control module 170 may then control the robot 160 (e.g., via control signals to the actuators 186) based on the authored motions in the portable character model 168 associated with the mood 169. In some cases, the control module 170 may select a gesture to perform and retrieve a motion from file 168 (e.g., the authored motion 154 with a set of task trajectories or parameters 155 shown in file 150). In the same or other cases, the control module 170 may select a movement for the robot 160 and select a motion with actions for this movement defined for this particular mood (e.g., the authored motion 156 with actions 158 shown in mood file 150 for one character 140).

The motion blending of control module 170 may be configured to generate reasonable transition actions between the actions (or positions) defined in the scripts so that every possible movement/action of the robot 160 does not have to be predefined. The AI of the control module 170 also acts to keep the robot 160 within the nature of the character even when not animated (not performing a movement), and this may include staying "alive" or in the moment (e.g., by retaining the expected body language based on definitions in file 168). As can be seen from FIG. 1, the robot 160 is controlled using a set of actions to perform a gesture or movement in a manner that is defined for a particular character, which provokes emotion and/or belief of life in a human observer of the operating robot actor 160.

In one embodiment, the robot actor (e.g., robot 160) will include four limbs (i.e., two legs with feet and two arms with hands), a pelvis, a torso, and a head. The robot will have no fewer than fifty actively controlled degrees of freedom (DOF). A key component used across the robot is the actuator (e.g., each actuator 186). The robot may use many different configurations of actuator. Each actuator has the following six key parts: (1) a high torque dense motor including a stator and a rotor; (2) a strain-based torque sensor; (3) a strain wave gear; (4) an over torque device to protect the wave gear; (5) an output bearing; and (6) position encoders located at the gear drive input and output. The actuators are built into the structure of the robot to maximize package density and to provide efficient heat spreading and cooling. Efficient cooling of the motor stator increases the continuous operating range of the motor, thus increasing actuator performance.

The structure of the robot is fabricated, in some cases, using a combination of additive and subtractive manufacturing. This allows the structure to be optimized for weight and stiffness. The optimization process typically removes material from the core of the part, where stress does not flow, leaving the part hollow. Additional features can be added to the hollow structure to utilize otherwise unused volume so that forced air moving through these features can efficiently remove heat from the base material.

The torso may contain the core processor/brain (and AI) of the robot. It will provide the power and communications infrastructure to the rest of the robot. The torso power can be sourced from stored energy (e.g., a battery not shown in FIG. 1 but understood by those skilled in the arts) and/or shore. If batteries are installed while connected to shore power, the batteries can be trickle charged. The communications between the robot and shore will typically be wireless. A wireless e-stop can also be used to reliably place the robot in a zero-torque safe mode.

The head may attach to the torso through a multi-degree of freedom joint that will allow the head to move in character. The head may include a sensor suite and preprocessing hardware to minimize bandwidth requirements. The head may be a standalone sub-system capable of running with only power and communications (e.g., Ethernet). Typical sensors in the head will include multiple cameras (e.g., a stereo pair, RGBD, and the like) capable of generating three dimensional (3D) point cloud data and also include a microphone array capable of listening and distinguishing point of origin. The sensors suite will give the robot situational awareness that may be used to inform the control module to assist its AI in deciding to command the motion of the head and eyes so that the robot actor can appear life like during an interactive multidirectional exchange with nearby observers.

Now, with the above understanding of the new robot actor and its design process, the following description presents a creative overview, a software design section, a hardware design section, and an application section. The creative overview section describes the philosophy and goals behind building an robot actor. The software design section describes a general software architecture to allow physical and virtual AI-driven characters to deliver life-like performance in an interactive setting. The hardware design section describes a general set of requirements for a physical robot actor and the creative data-driven design approach developed by the inventors to meet those requirements. The application section describes a small self-balancing robot actor providing design choices and innovations related to a bipedal character platform fabricated by the inventors with the intent that this would be able to perform or provide a wide range of small characters (e.g., characters 1 meter or less in height).

Turning to the creative overview and the philosophy behind building a robot actor, the inventors were tasked with creating a robot that possesses enough acting range, including character-specific and mood-specific body language, gestural mannerisms, facial clues, and organic timings across all elements) to portray a myriad of specific characters in specific moods. This portrayal occurs during nonlinear AI-driven experiences while free-walking among people, while the robot also is aware of those people and is interacting with them appropriately. Rather than creating fifty robots to portray fifty characters (for example), it was decided that one robot would be created with enough acting capability to portray all fifth character itself (with fifty being just an example of a relatively large set of characters). Each character portrayal by the robot actor is designed to meet the illusion of life standard often used in the entertainment industry for on and off-screen devices (or human actors) used to present characters. The inventors designed the robot actor so they are not depending on the final "skin" overlay to bring a given character to life. Instead, the design process is such that it is assured that a character's signature behavior is clearly discernable prior to the application of any skin overlay. In this way, the type of acting performed by the robot sends powerful subconscious signals to observers that the character possesses interior thoughts and feelings. Stated differently, the robot actors described herein are platforms for creating and deploying interactive physical characters who autonomously demonstrate the illusion of life.

One goal for the robot design is to provide the illusion of life, which requires acting beyond archetypal characters to individual characters. To that end, the inventors identify, record and/or author, store, and deploy the set of eccentricities that differentiate an individual character from all other characters (e.g., through their body language, gestures, and movements as discussed with reference to FIG. 1). These differentiators include a character's inner workings and how they are outwardly manifested. In life, differentiators allow us to easily identify friends, family, and iconic characters. Differentiators make them interesting to us. The absence of differentiators makes us uncomfortable, even in relation to strangers. In the natural order of things, each person displays quirks that sort them out as uniquely individual. A room full of unique individuals feels normal to observers while a room full of people with clone-like sameness feels creepy. The manifestation of these spikes of difference is provided by hardware and software in the robot actor that can deal with deep and constantly remodeled nuances of psychological states (or "moods" as labeled in FIG. 1) and the resulting nuances of physical behaviors (e.g., via AI in a control module on the robot actor).

Authoring the acting of these uniquely individual characters, including their spikes of difference—can involve the participation of the best creative talents in the animation field. To that end, design of a robot actor may be adapted to allow character animators to directly author control data for the robot such as in a free-walking robotic space. The robot design system (with the station 110 of FIG. 1) may be configured to: (a) allow the animators to use familiar tools for character acting; and (b) allow them to see the results of their efforts in accurate simulation immediately and at their own work stations (e.g., via a GUI as shown in FIG. 1). Acting choices that cause the robot to fail can be returned to the character animator to fix, and the fix typically is not merely the result of the automated muting of overly aggressive or challenging actions but, rather, an alternative successful acting choice that is just as emotionally dramatic. A broad range of behaviors (or gestures or movements as labeled in FIG. 1) authored by the character animators is then used to train the system. In this way, procedural animation is born via richly performed character animation to achieve the illusion of life.

During AI-driven interactivity, the robot actor preferably is able to improvise while staying in character. To achieve these improvised moments, AI in the robot's control module is used to provide real-time modeling of behaviors based on personality, emotion, rapport, and other factors (with "mood" being an overarching term used in FIG. 1). These real-time shifts in "interior" modeling, both subtle and dramatic, are provide by finely tuned shifts in exterior modeling so that physical expressions are linked to a character's moment-by-moment thoughts and feelings (or "mood"). In order for this moment-by-moment acting to be discernible to observers, especially in intimate or casual moments, the physical expression of nuance is desirable.

AI-driven interactivity is non-linear, which makes the order of events and the amplitudes of expression unpredictable until milliseconds before they are deployed by the robot's controller or control module. Hence, the robot actor is configured to have a broad ability to withstand this constant state of disruption while continuing to act in character and at high quality. AI-driven interactivity also invites extended periods of communication, companionship, and bonding between the robot actor and the people it encounters. Whether continuous or accumulative, the duration of these experiences is expected to be much longer than those tied to prior robotic devices especially those used to entertain passengers in drive-by rides and attractions and longer than a character's screen time (e.g., in a movie context). Since this acting will be "onstage" longer and judged more thoroughly, it preferably is adapted to sustain the highest quality.

AI-driven interactivity will engage the robot actor with those who are close, those who are mid-range, and also those who are distant. The robot's acting should, therefore, scale all the way from casually small to theatrically big. This scaling includes the softness and/or loudness of voice and the intimacy and theatricality of body language, facial expression, and gesture. One moment the character provide by the robot actor may be quietly sharing a secret with one person who is close enough to feel its breath and the next moment it may be "playing to the balcony" for a group of people who are walking past. This continuation across broadly contrasting modes of acting is unlocked by the AI era, and it is addressed by engineering strategies beyond those associated with previous robotic projects.

Useful to providing the illusion of life is the creation of behaviors (or gestures, movements, and the like) that indicate that a given character has thoughts, feelings, and a very distinctive personality. The outward manifestation of the AI-driven inner thoughts and feelings preferably appears biological. Paths of action and accelerations/decelerations of full body language, of limb gestures, and of facial expressions should appeal "natural" in a biological sense, e.g., as if motivated by muscle and bone rather than actuators and metal. This sense of biological plausibility includes the intentional caricature of behavior and physics through the artistry of character animation. A thoughtfully caricatured bit of behavior can feel more emotionally true than slavishly documented naturalism. For example, a character demonstrating how it feels to be terrified in a stylized sense can be more emotionally effective than if it merely demonstrates how it looks to be terrified in a documentary sense. So, the ability to move with organic grace while strategically caricaturing reality rather than slavishly mimicking reality it preferably used to control each robot actor for each character it plays or presents to the public.

Each character portrayed by an robot actor has its own set of behaviors that are expressed across a full range of emotions or moods. Many of these characters are iconic, meaning that their set of behaviors is embedded in the public consciousness. The public will notice that there is something amiss if the robot actor is not controlled so as to remain true to the iconic character's set of established behaviors (or gestures and movements in light of its known body language for each of its moods). When the robot actor uses dynamic balancing, dynamic changes of speed, and dynamic changes of direction (i.e., any physical expression not originally authored by a character animator or actor), it is in danger of betraying the set of behaviors expected from the iconic character, and this would break the illusion of life. Therefore, the inventors devised ways to dynamically adjust balance, speed, and direction while respecting the signature qualities of an iconic character's set of behaviors. Dynamic corrections appear to be part of the expected set of behaviors for that specific character in its specific mood, and this protects the illusion of life.

In one prototype of the robot actor, the inventors purposely scaled the robot actor so that it was too small for any human in a costume to replicate and was also close as possible to the size as represented in the character's original story context. This scale choice coupled with free walking capabilities was meant to trigger a subconscious reaction from the observers that the character presented by the robot is genuinely itself and is alive. When the presentation of a magic trick passes a certain threshold of quality, the audience's intellectual awareness of the inherent trickery is overridden by an emotional acceptance and, in some cases, an emotional celebration of the trick as true magic. People want to be fooled and delighted, and the inventors designed the robot actor to deliver on this public desire for magic that is performed at a high enough quality level to earn their delight to make them say "how did they do that?"

However, as will be understood by those in the robotic arts, working at a small scale presents distinct engineering challenges. Once such challenge is free walking with dynamic balancing while delivering a convincing acting performance. This is further challenging because the robot actor providing smaller characters often will have a small body and an oversized head. Short animated characters typically have heads that are quite large in proportion to their height. Since this short character or robot actor is walking among humans in many planned uses, it spends a lot of its time looking up at human faces and also looking back and forth between multiple moving human faces. Of course, a normal acting range includes looking off and looking down, too. To keep from constantly toppling over, the inventors created the small robot actor with lighter head materials combined with a strong, nimble means of movement. Another challenge of scale is achieving small arms, hands, and fingers that possess enough range of expression to be considered a legitimate contributor to a character acting platform. This range of expression is challenging even at an adult human scale, but it is even more challenging to engineer at the smaller scale of many characters (e.g., about 1 meter or less in height).

The robot actor and the design system (and station) for creating the robot's control scripts and other data were achieved through a combination of a broad range of capabilities and components that are reliably integrated. As discussed herein, these include: (a) user friendly authoring tools for characters in free walking AI experiences; (b) character specific behavior sets (e.g., gestures and movements), authored and parameterized, that can be driven by AI of a control module; (c) dynamic balance, change of speed, and change of direction within the behavior sets; (d) access to AI deliberation, performance, and speech with minimal latency; (e) access to AI rapport modeling between character and individual people; (f) onboard sensing to maximize autonomy, informing AI; (g) in-eye cameras for true eye contact, informing AI and/or driven by AI; (h) eye tracking of moving objects, informing AI and/or driven by AI; (i) eye darts that are neural for biological realism, motivated for sentient realism and driven by AI; (j) directional hearing, informing AI; (k) voice that sounds biological, driven by AI; (l) breath provided by diverted heat exhaust for biological realism and driven by AI; (m) engineering of ultralight head to aid in balancing and to allow caricatured physics; (n) full range arm, hand, and/or finger expression to portray many characters, driven by AI; (o) ability to touch objects and humans, informing and driven by AI; (p) ability to map space and self-locate, sensing informing AI and navigation driven by AI; (q) ability to locate and track human companions, sensing informing AI; (r) ability to point at, sensing informing AI and driven by AI; (s) onboard computing; and (t) onboard power. The successful integration of these capabilities and components into a true character platform is innovative and useful for achieving the illusion of life in a robot to transform it into one of many characters.

Figure 2:
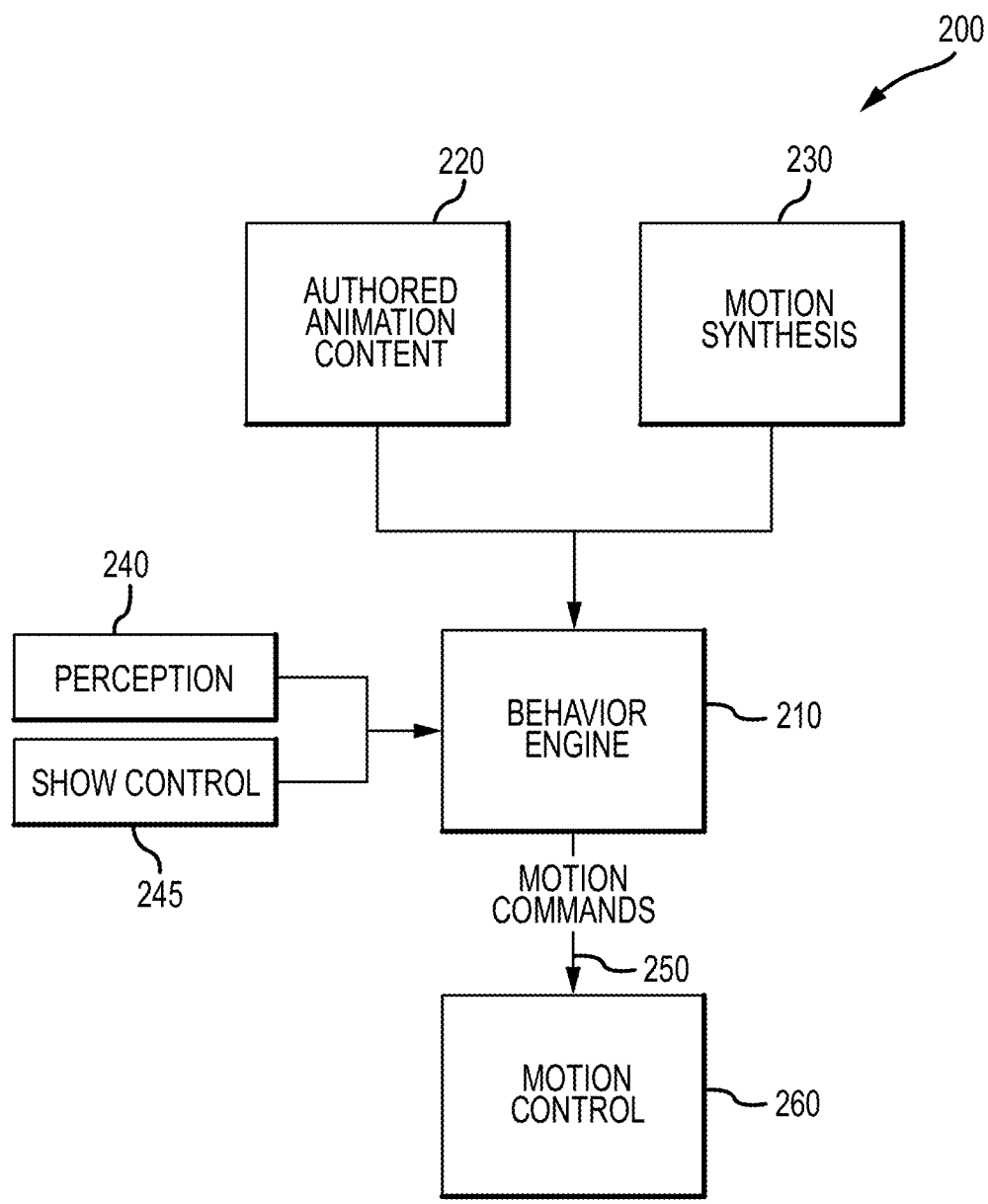
FIG. 2 is a functional block diagram of software architecture for a robot or robot actor of the present description such as to implement a control module of the system of FIG. 1.

FIG. 2 is a functional block diagram of software architecture 200 for a robot actor of the present description (such as robot 160 of FIG. 1), which may be used to implement a control module 170 of the robot 160 of FIG. 1. The novel software architecture 200 was developed to transform a legged character platform or robot into a capable actor. The associated requirements for such an actor include the ability to: (a) move and locomote in style and emotion that matches one or several character performances; (b) interact with nearby people in a life-like manner while navigating freely through an environment; and (c) execute complex narratives that may branch and/or loop based on external inputs from the environment or a remote operator (not shown in FIG. 1 but understood by those skilled in the arts as providing wireless control signals to the robot 160).

FIG. 2 illustrates the major components of one proposed software architecture 200 designed to bring the illusion of life to a free-roaming bipedal robot. As shown, a behavior engine 210 takes as input authored animation content (e.g., scripts for gestures, movements, and the like) 220 and motion synthesis 230 along with perception (sensed or perceived data) 240 and, optionally, show or remote controls 245. In response, the behavior engine 210 generates and outputs motion commands or control signals 250 that are transmitted to a motion control module 260 (e.g., to selectively operate the set of actuators on the robot).

The behavior engine 210 is configured for creating interactive character performances for a capable robot actor. A robot actor should be capable of not only executing stylized motions but also queueing, combining, and generating motions on-the-fly in ways that support the illusion of life. This results in complex combinations of fluid motions that can react to the unpredictability of environmental interactions. To accomplish this, the inventors developed a library of behaviors (e.g., scripts of movements, gestures, and the like), methods for smoothly combining and sequencing them, and perception and AI modules for providing rich interactions. This provides robot operators the ability to quickly craft new entertainment or other performances that include the robot actor that observers find representative of characters they know or are getting to know and enjoy.

With regard to types of behavior and in order to react accordingly in a show or interactive context, an robot actor is preferably equipped with a large library of potential behaviors (or gestures) and movements/motions to create a compelling performance, and these may be stored and retrieved from memory by the behavior engine 210 as shown with authored animation content 220. Direct animation playback provides the simplest type of behavior that can be provided by a robot actor, and this entails extracting motion tasks from pre-authored animations 220, blending animations where necessary, and sending the resulting tasks to a controller 260 for execution as shown with motion commands 250.

One proposed approach relies on task-space trajectories for animation playback, which is a major differing point from traditional control of animatronics/robotics. Instead of directly specifying joint position trajectories to be tracked by a low-level controller, the desired animation trajectories are expressed as a set of motion tasks representing high-level objectives for the controller. The extracted task-space trajectories can define poses and twists for rigid bodies like the pelvis or feet, footstep timings and locations, and/or centroidal momentum objectives that can be weighted or prioritized by the controller. Whereas traditional figure control systems prioritize tracking animated joint positions as accurately as possible, a task-space approach affords the controller additional freedom to use model-based optimization and control techniques to interact with the environment through contact while stabilizing the centroidal dynamics to maintain balance. Note, it is still possible to prioritize tracking of joint position trajectories as a specific motion task within the proposed framework 200, e.g., in scenarios where precise motions are required and interaction with the environment is limited (e.g., upper body motions).

Another approach to providing robot behaviors is through synthesized motions (e.g., procedural animation). Direct animation playback satisfies cases where a static environment and set of interactions are known ahead of time so that a viable trajectory can be planned by an animator/robot operator. However, this case is exceedingly rare as an actor/character robot typically must tune its performance to respond to even the slightest stimuli. Direct animation is also not applicable when navigating a new environment or walking through an unpredictable crowd of people. For non-scripted use cases, motions need to be synthesized on-the-fly and sometimes in reaction to inputs from perception sensors (e.g., part of the I/O 164 of robot 160 in FIG. 1 and with such synthesis performed by the AI of the control module 170). A self-balancing, legged robot imposes the additional constraint that these animations are dynamically feasible. Also, they should appear to be in style of the character the robot is intending to represent.

In some approaches, the control module operates the robot to provide interactive behaviors. Some behaviors are generated in real-time because they depend on the evolution of the environment, as observed through external or internal sensors. These behaviors often involve an interactive component e.g., an interacting person can provide some input to the robot and observe an immediate reaction. This requires a control loop acting on sensor inputs (perception 240) and producing motion commands 250 to be processed by the lower-level control layers of the motion control 260. Face tracking is a concrete example of this type of behavior. A camera can be used as an external sensor to provide perceptions 240. A perception module (in the behavior engine 210 or included in architecture 200 to provide the perceptions 240) extracts face locations relative to the robot's head, and a control loop in the behavior engine 210 issued motion commands 250 for the robot's neck to track the detected faces and their present locations.

Teleoperation or puppeteering may also be used and is a common method used in character development to quickly explore new ideas and to emulate technology that may be available in the future. Teleoperation behavior is implemented in the architecture 200 through show control 245 that allows an operator to provide control data such as walking velocity commands to the robot actor. This allows for a control scheme like that of a video game in which the operator uses a gamepad to control a character. The architecture 200 provides this simple interface without making sacrifices in character style or performance ability.

In order to effectively combine different behaviors, motion groups may be defined to restrict a behavior to a subset of controllable tasks on the robot. This allows, for example, one behavior to control the lower-body walking tasks and a separate behavior to control the upper-body and head motions. To produce smooth, believable, and kinematically and dynamically feasible motions, animations tasks are preferably processed at runtime to ensure that there is a smooth transition from the robot's actual configuration to the initial configuration specified by the animation (or scripted gesture or movement). This can be accomplished through motion blending. This can be useful because an animator has no choice but to assume some initial configuration of the robot actor from which to start their animation. Permitting some discontinuities between subsequent behaviors enables rapid experimentation with show animation ordering and improves robustness when interleaving animations with synthesized and interactive motions. Blending becomes even more useful for a system that is continuously replanning its motions. A robot actor preferably is able to quickly and smoothly respond to stimuli from nearby people and the environment. This involves the behavior engine 210 inserting and removing behaviors from the behavior queue and modifying behavior parameters in response to perception inputs 240.

Figure 3:
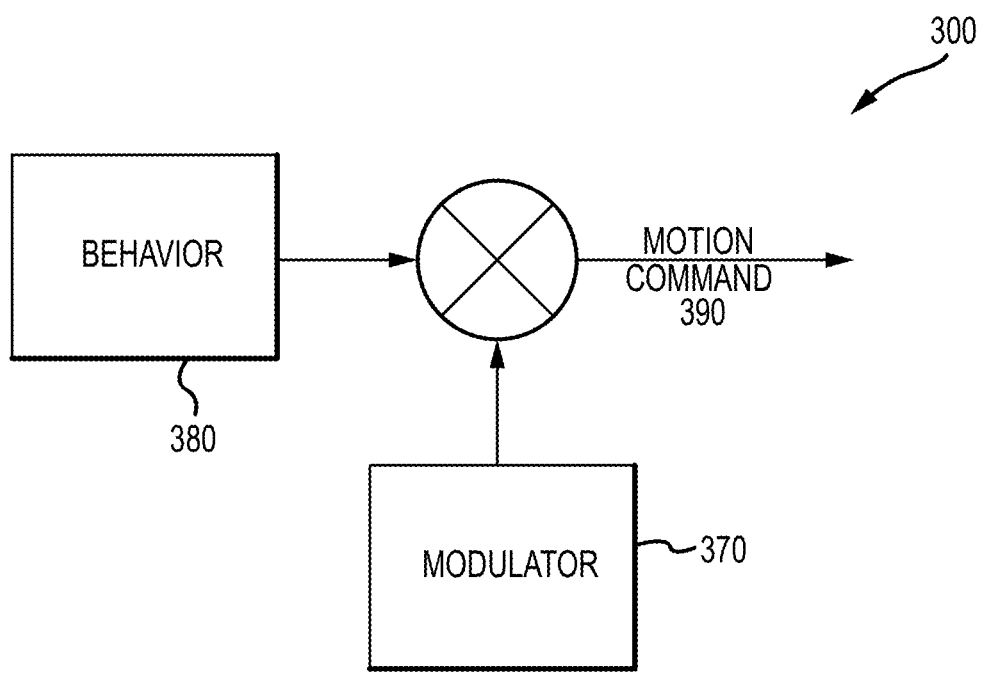
FIG. 3 is a functional block diagram of a portion of a behavior engine such as the engine of the system of FIG. 2 showing use of a modulator to provide periodic or randomized motions atop other movements, gestures, or behaviors of a robot actor.

With regard to behavior modulation, a convincing character performance by a robot often benefits from some subtle periodic or randomized motion overlaid atop its basic movements. Idle motions like breathing or looking around fall into this category. In order to ease the development of behaviors and allow these periodic or randomized motions to persist across behavior changes, the concept of behavior modulation may be introduced into the architecture 200 of FIG. 2 such as within the behavior engine 210. FIG. 3 is a functional block diagram of a portion of a behavior engine 300 such as the engine 210 of the architecture 200 of FIG. 2 showing use of a modulator 370 to provide periodic or randomized motions atop other movements, gestures, or behaviors 380 of an robot actor via motion commands 390 (which may correspond with commands 250 of architecture 200 in FIG. 2). The modulator(s) 370 composes with different behaviors 380 additively as shown in producing the motion commands 390. The modulators 370 run alongside behaviors 380 and apply the desired subtle modifications to the extracted motion tasks before they are sent as motion commands 390 to a controller (e.g., motion controller 260 shown in FIG. 2).

In order to craft a compelling character performance or show with a robot, behaviors are sequenced. The simplest type of sequencing is a queue of behaviors, where one is played after another. A queued sequential show or operational performance has limitations, though, when faced with interaction with humans. For example, it has no ability to branch a show or performance. This is important when a person can provide different inputs to the character/robot actor, which may require different responses. Branching and looping can be supported by combining queues, decision trees, and/or state machines to form composite sequences.

Figure 4:
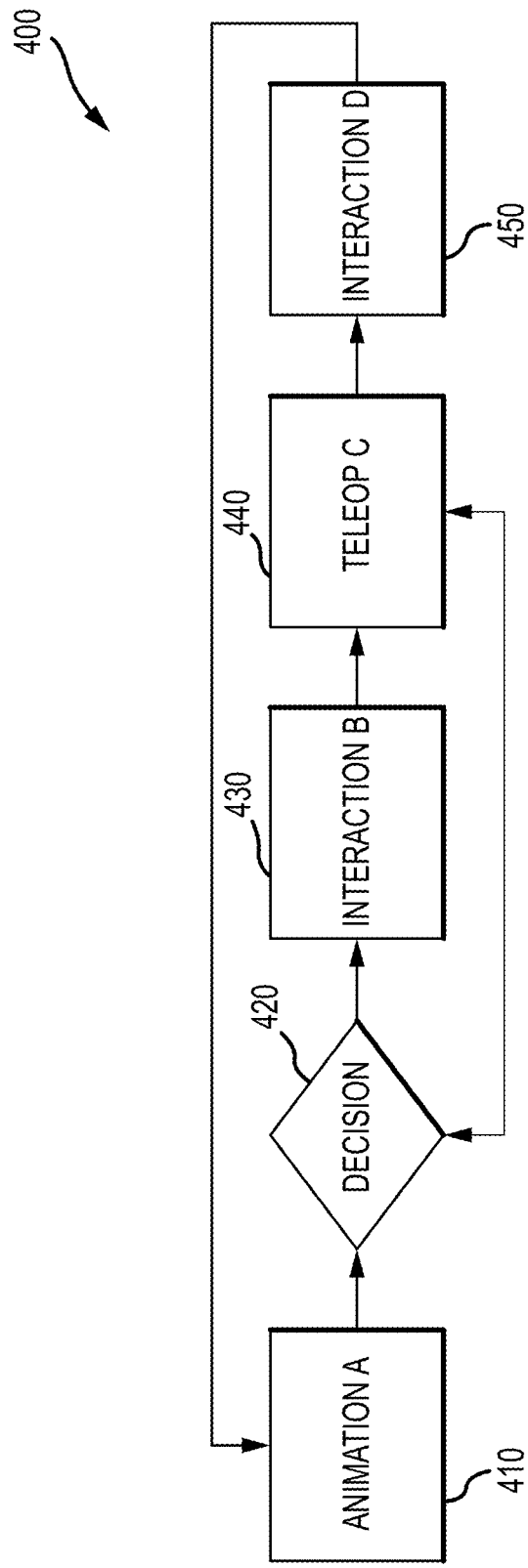
FIG. 4 illustrates a show or performance schematic for a robot actor including a combination of behaviors and sequencing rules.

FIG. 4 illustrates schematically a show or performance for a robot actor with the show/performance 400 being a combination of behaviors (or gestures, movements, or the like) and sequencing rules. As shown, the show/performance 400 starts with the robot being controlled to perform a first animation (e.g., a scripted movement or gesture or behavior) 410. The behavior engine then performs a branching decision at 420 to either proceed with an interaction 430 or to skip this interaction 430 and branch to a teleoperation 440. After the teleoperation 440 is performed, the sequenced show/performance 400 continues with the robot being controlled to perform a second animation 450 and then looping back to performance of the first animation 410.

FIG. 4 shows an example of a complex show/performance 400 with branching, looping, and a variety of behaviors. In some cases, events may be included that are defined to trigger transitions between behaviors. These events may originate from within the active behavior, and this is used for a fixed-duration behavior after which it must trigger an exit event. Events may also originate from other sources, like from perception sensors, which is used when an external event triggers the start of a behavior like a face being recognized in front of the robot, the robot falling over, and so on.

Now, it may be useful to discuss how the new design approach for a robot actor supports animation (or control script) authoring to create feasible animation content for a particular robot actor configuration such as a relatively small legged robot. Traditional character animation targets either virtual on-screen characters for motion pictures and video games or fixed-base animatronics. Both targets have some constraints that dictate the feasibility of animations. For a video game character, there will likely be a requirement that the motion be smooth and lifelike. Fixed-base animatronics have stricter requirements since the character's joints now have physical torque and speed limitations, are subject to inertial effects, and have zero tolerance for stretching and squashing of links.

Balancing, free-walking robots place even stricter requirements on animation content. In addition to the typical joint and actuator constraints imposed by an animatronic, balancing robots need to satisfy the rigid body dynamic constraints of a floating-base system with switching contacts. As such, animators or other movement/gesture designers are required to work around concepts like the base of support, center of pressure, and centroidal dynamics to ensure that their animations are physically achievable and can be tracked by the available control system (on the robot). Due to the complexity of these concepts, animating a physical legged character (to be presented by a robot) is a slow and tedious process. To reduce the burden on the animator, the inventors introduce tools that automate repetitive or ill-conditioned processes and provide a fast feedback to the animator (or design station operator) using a simulation environment. These components of the design system are described in detail in the following paragraphs, and each may be provided on the design state 110 of FIG. 1 such as in the script or animation generator 120 or as a separate software application run by the CPU 112.

One useful tool for use by animators/designers of animation/scripts is a footstep planning tool that is useful for providing a suggested foot path (which may be based on a particular mood as well as the character's body definition/walking traits). One of the common tasks an animator must complete when creating a new animation is to define a walking path for the character. This is typically accomplished by animating a pose trajectory for the character's body and selecting the left and right footholds that follow the walking path and match the physical characteristics and style of the character, e.g., nominal stance width, stride length, and so on. Next, the animator determines the timing of each contact phase for the footstep plan. That is, the time at which each foot lifts off the ground to initiate a step and comes back into contact with the ground to complete a step. Juggling these parameters and constraints to generate a complete footstep plan is a slow and repetitive process, especially for a long animation that requires many steps.

Figure 5:
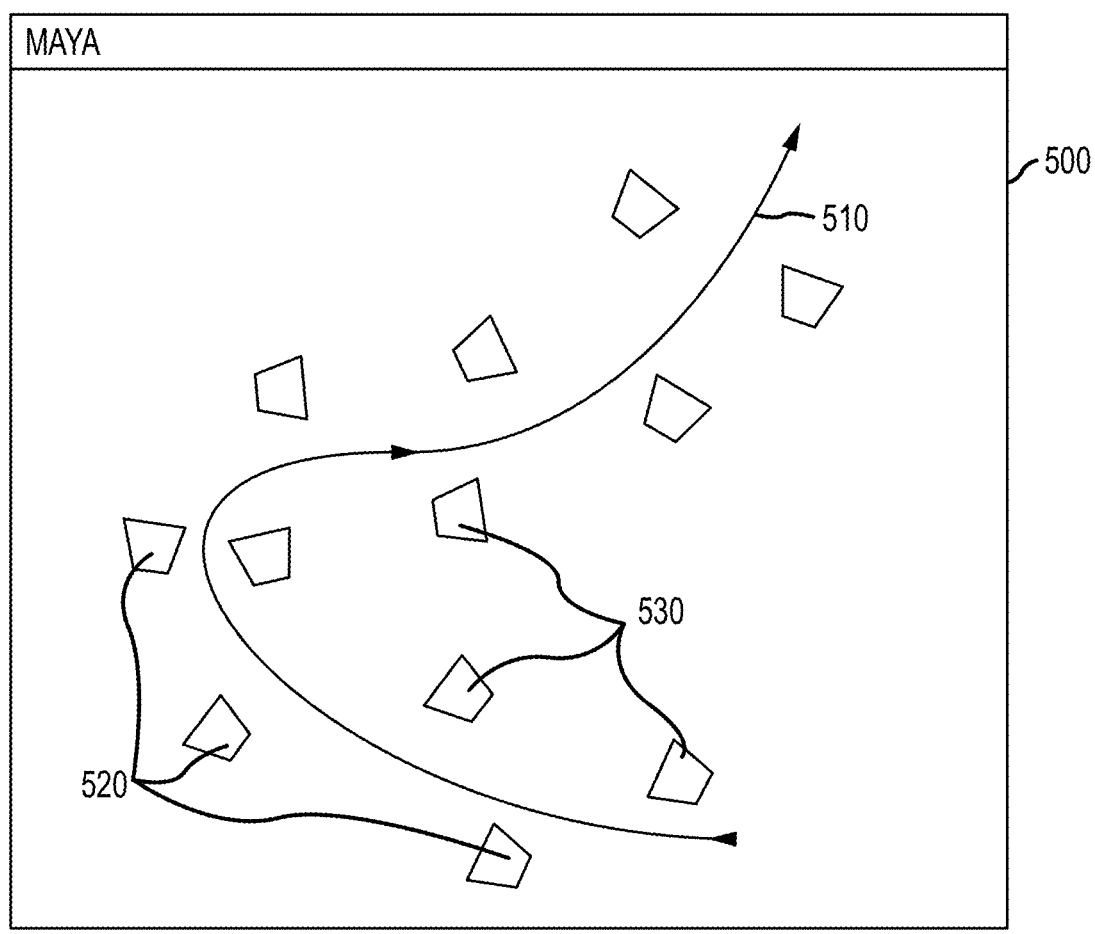
FIG. 5 is a screenshot of a user interface that may be displayed on an animator's or operator's monitor during use of a footstep planning tool of the present description.

To make this job easier, a footstep planning tool was generated that automates the footstep planning process with the tool being integrated directly into the animator's user interface or GUI. FIG. 5 illustrates a screenshot 500 of an interface to the tool showing a character's path or walking trajectory 510 along with a suggested set of left footsteps 520 and a suggested set of right footsteps 530. An animator can use the footstep planning tool to derive footsteps 520, 530 from a walking trajectory 510 drawn in animation software. The tool was configured to rely on a parametric step planner (e.g., performing motion synthesis as discussed below) to compute footholds and timing information from a walking path defined by a set of animation curves. The animator can fine tune the behavior of the tool by modifying the input parameters provided to the tool. For example, the animator can adjust the nominal stance width, step duration, and/or the stance foot angle (i.e., for pigeon-toed or duck-footed walking). Once the footstep plan is generated, the animator can further tune the individual steps by hand.

Another useful tool for animators that is provided in the new robot design system is an automatic animation correction tool. Given the large number of dynamic and kinematic constraints placed on untethered robots especially legged characters/robots, it can be difficult for a human animator to author a feasible animation even when feedback mechanisms are available to identify violations of these constraints. This is in part because small modifications to the animation curves can have large and rippling effects that are difficult to predict. The whole-body controller module can correct for infeasible animation trajectories to a reasonable extent during tracking, but there is no guarantee that the intended style or emotion of the original animation will be preserved by the resulting motion in these scenarios. To ease the job of the animator in authoring feasible animation, the inventors present two solutions: (1) direct optimization; and (2) iterative simulation.

With regard to direct optimization, animations for legged characters must satisfy the constraint that the computed center of pressure lies within the base of support at each animation frame. This is often difficult to achieve by editing the animation curves directly. For this reason, a direct optimization tool can be included that modifies the horizontal translation of the pelvis link to achieve a feasible center of pressure trajectory. This method operates on the assumption that the horizontal pelvis trajectory has a large influence on the resultant centroidal dynamics, and, therefore, on the center of pressure, but a small influence on how the animation is perceived by an audience. By modifying these two DOFs using an automated tool, the animator gives up some artistic intent in exchange for a simplified authoring process.

With iterative simulation, a set of motion tasks are extracted from the animation, and a dynamically feasible center of mass (CoM) trajectory is computed from the corresponding desired footholds and angular momentum trajectory. A whole-body controller (e.g., the control module 170 of FIG. 1) is then used to track the motion tasks and CoM trajectory in simulation, ignoring the original pelvis translation trajectory defined by the animation. Next, a new pelvis translation trajectory is extracted from the simulation results and reimported (e.g., into Maya or the like). Finally, the animator modifies any relevant animation curves to satisfy kinematic and/or artistic constraints given the updated pelvis trajectory, and a new simulation is run to obtain the result of tracking the updated motion tasks. The process is repeated iteratively until the animator is satisfied with the result.

A third useful tool for animators in creating animation or controlling scripts for robot actors is a feasibility feedback tool or process. The end goal of the animation authoring process is to develop an animation that suits the desired character and that is feasible and will be successful on a particular hardware platform (such as a two-legged robot). The final step, before running the animation on the hardware itself, it to check that the animation passes a dynamic simulator. A successful simulation run gives operators confidence that the animation is well suited for the real hardware that is going to use the animation to provide a particular character.

Figure 6:
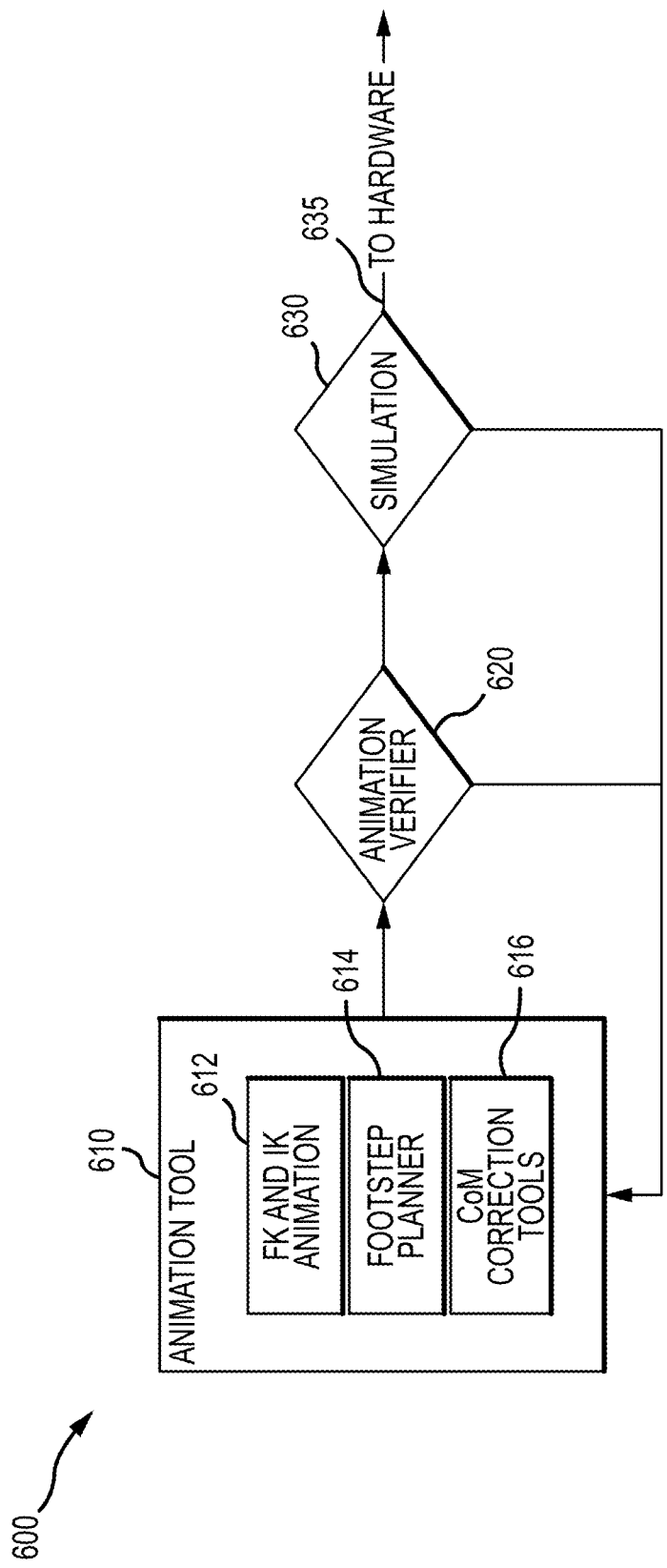
FIG. 6 illustrates a functional block of an operating suite of software tools that may be run on a typical design station, such as that shown in FIG. 1, to generate control animation or scripts for a robot actor of the present description.

FIG. 6 illustrates a suite of software tools 600 that may be run on a typical design station used to generate control animation or scripts for a robot of the present description. As shown, an animation tool 610 is run on the design station (such as station 110 of FIG. 1) that includes an FK and IK animation application or tool 612 along with a footstep planner 614 and CoM correction tool 616 (both described above). The output animation/scripts from the animation tool 610 are run through an animation verifier at 620 and then a dynamic simulator 630. Feedback may be provided to the animation tool 610 to allow corrections and/or modifications or, as shown at 635, the simulation/scripts may pass simulation 630 and be transmitted to or uploaded on the hardware platform (e.g., a robot actor). In this embodiment, animators use tools built directly into their animation editing software to automate the legged character animation process, and they can use external tools to quickly verify their animations.

To allow the animator to quickly iterate and verify their animation, the simulation tool 630 was developed that allows the animator to run animations in the dynamic simulator and import the results back into the animation tool 610. This quick feedback loop is useful for iteratively converging on an animation that both satisfies the character constraint and will be feasible on a real hardware platform. In order to accelerate the loop, an additional tool in the form of an animation verifier 620 may be included that is adapted to quickly search for and display common animation errors. The resulting analysis includes errors like feet slippage while in contact with the ground, joints exceeding their limited ranges of motion, and the center of pressure exiting the base of support. The results of the analysis may be provided visually such as in bar graph form or the like in the animator's GUI so as to more quickly provide insight into problems that may be preventing animation from completing successfully in simulation 630 or after the animation/scripts 635 are sent hardware.

The robot controller (or a control module with AI) preferably adapted to perform motion synthesis to perform tasks such as generating stylized walking gaits using a parametric planner. In order to navigate freely in a dynamic environment, a robot actor was designed and fabricated that is able to walk along a desired path generated by a high-level planner (for autonomous operations) or by joystick input (for teleoperation). In addition to a stable, omnidirectional controller for legged locomotion, the robot controller is designed to have the ability to generate stylized gaits in real time, which allows the robot to convey the "emotion of motion" of a given character performance as it moves through the world. Because the desired path and/or velocity of the character is determined at runtime, the walking motion is synthesized online. While these requirements draw several similarities to character control systems found in video games, the robot actor application imposes significant additional challenges due to the kinematic and dynamic constraints of a physical character/robot. To address these issues, a method is proposed by the inventors to synthesize bipedal locomotion using a parametric gait planner composed of a footstep/contact planner and several trajectory generators.

Figure 7:
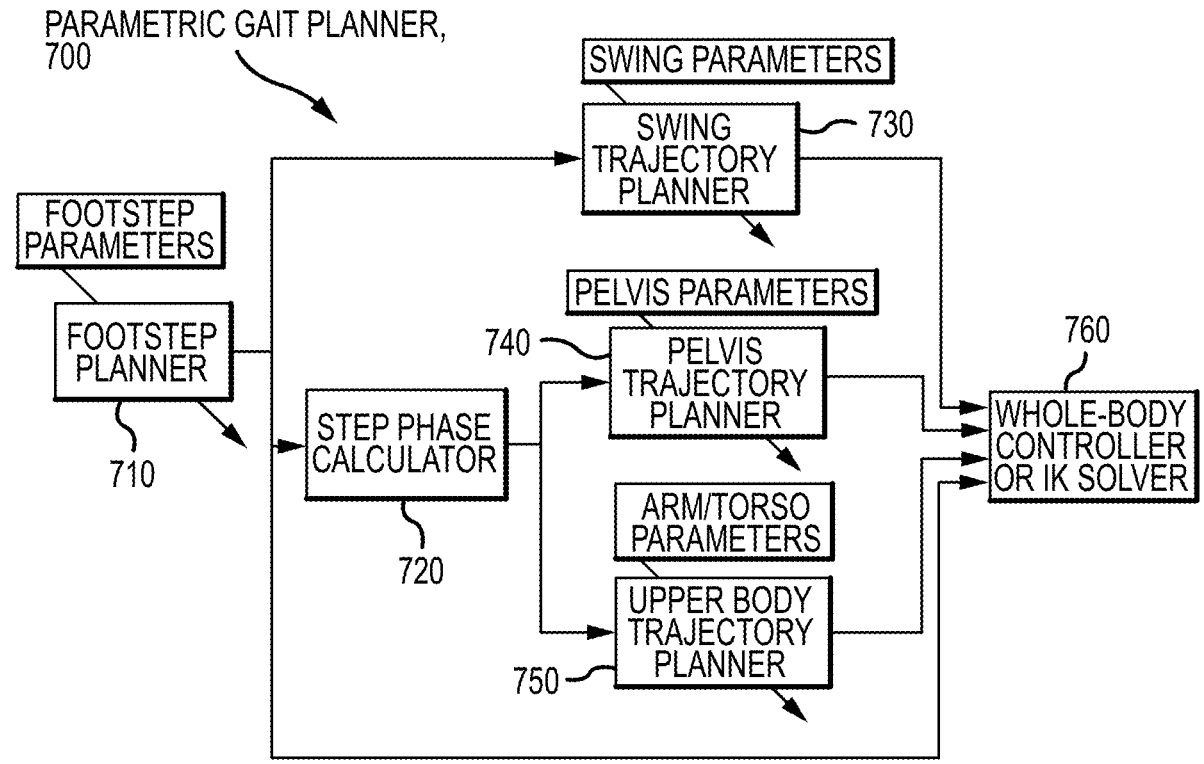
FIG. 7 is functional block diagram of a parametric gait planner of the present description illustrating its components as well as data flow during its operations.

FIG. 7 is functional or high-level block diagram of a parametric gait planner 700 illustrating its components as well as data flow during its operations. Its components include a footstep planner 710 (which takes footstep parameters as input), a step phase calculator 720 (which takes the footstep planner output as its input), a swing trajectory planner 730 (which takes swing parameters and footstep planner output as its input), a pelvis trajectory planner 740 (which takes pelvis parameters and step phase calculator output as its input), an upper body trajectory planner 750 (which takes aim/torso parameters and step phase calculator output as its input), and a whole-body controller or IK solver 760 (which takes the output of the planners 710, 730, 740, and 750 as its input).

As shown in FIG. 7, the parametric gait planner 700 computes a set of footholds, contact phases, and task-space trajectories that define the shape of the character's gait over a predefined preview window (e.g., one second into the future) give a set of floating-point parameters that can be modified online. The resulting whole-body plan is generated in real-time based on the current robot state and desired locomotion path (or gait velocity). Because each walking style is encoded by a set of real-numbered parameters, this approach also allows multiple styles to be blended together, enabling smooth transitions within performances. The primary components of the planner 700 are described below.

Figures 8A, 8B:
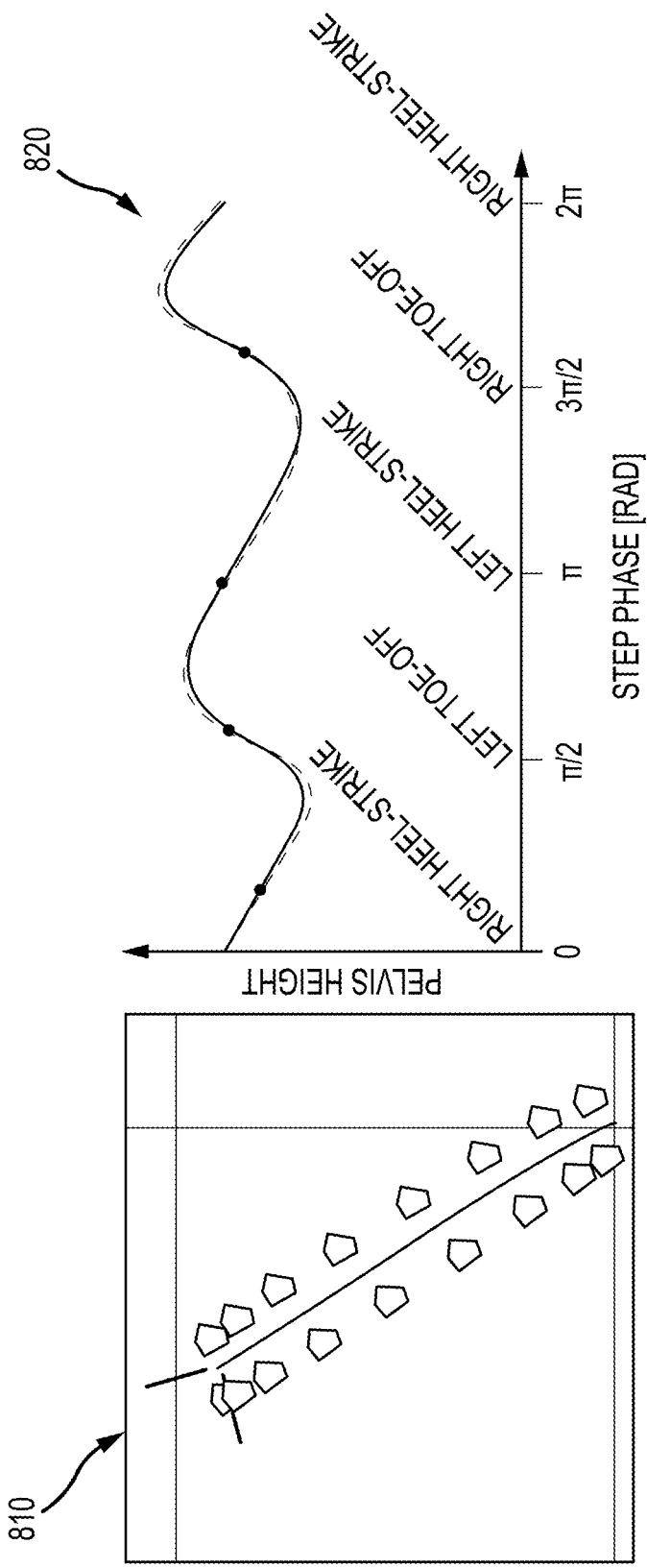
FIGS. 8A and 8B illustrate, respectfully, a footstep plan derived from a desired walking path and a graph showing an example of a task-space trajectory.

The footstep planner 710 computes the upcoming foothold poses and step timings over the desired preview window given an input velocity from a high-level planner or teleoperator. The target walking velocity and turning rate are buffered and integrated to obtain a desired walking path over the duration of the preview window. The resulting pose trajectory is used to compute the upcoming footstep plan given a set of parameters describing the nominal stance, stride, and timing constraints. FIG. 8A illustrates an example of a footstep plan 810 derived from a desired walking path (shown with dashed line).

Turning now to the step phase calculator 720, while real-time footstep planner 710 is often sufficient to support omnidirectional walking using a generic stepping controller, the style of the walking gait is largely determined by the "shape" of the swing foot, pelvis, and upper-body trajectories. In order to synchronize these trajectories with the footstep timings, a "step phase" angle may be defined that serves as the time-varying input to each generator. This simplifies the parameterization of these trajectories, which are often periodic over a two-step cycle given a constant velocity. The step phase angle spans 0 to a $2\pi$ radians (or one gait cycle) and is aligned with the major contact state transition events during walking as shown in the graph 820 of FIG. 8B, which shows an example task-space trajectory defining the desired pelvis height as a series of waypoints at selected step phase angles.

Turning now to task-space trajectory generators, given a set of input parameters for a stylized gait, the planner 700 computes desired task-space trajectories for the pelvis (with planner 740), feet (with planner 730), and upper-body (with planner 750) based on the current state, target walking velocity, and/or upcoming foothold positions. Each trajectory is expressed as a series of normalized waypoints that define a target Cartesian or joint-space position and velocity at a given step phase angle. The graph 820 of FIG. 8B includes an example trajectory that defines a series of Cartesian waypoints for the pelvis height. Likewise, the shape of the left and right swing foot trajectories is encoded as a series of waypoints spanning the respective lift-off to touch-down phase angles. In each case, the waypoint positions and velocities are derived from an intermediate parameter set representing traits that generalize across various target walking velocities and foothold positions. Examples, may include vertical bounce amplitude, arm swing amplitude, swing foot apex height, toe/heel-strike angle, and the like.

With regard to the whole-body controller 760, the derived task-space trajectories and footstep plan defined a set of control objectives that are tracked using an optimization-based whole-body controller 760 (see also the motion control discussion in the following paragraphs). A dynamic planner is used to plan a feasible center of mass trajectory at each time-step that is tracked using momentum-based control. While the parametric planner specifies a desired pelvis height and orientation trajectory, the horizontal translation of the pelvis is determined as a result of whole-body controller optimization. This approach allows the controller 760 to adjust the swing foot and center of mass trajectories online to maintain stability.

Given a sufficiently expressive parametric planner, there are several methods that can be used to select a set of gait parameters that will approximate the style of character performance. In some embodiments, a two-part approach may be used to allow animators to author parametric walking gaits using a combination of novel and traditional animation tools. With regard to a first method (or hand tuning), a configuration file or graphical user interface may be used, and an animator can hand tune the footstep planner 710 and trajectory generator parameters to achieve a desired walking style. This process is simplified by selecting a compact and intuitive parameter set for the proposed planner 700. The ability to describe the specific function of each parameter is an advantage over model-free trajectory generators such as neural networks that appear as black boxes to the user.

With regard to a second method (or parameter fitting), it may be advantageous, in many scenarios, to derive the parameters of a specific walking style directly from a set of example animations. This approach allows animators to use traditional software tools to create content. In this case, nonlinear optimization or policy search can be used to compute a parameter set that approximates the style expressed in an animation training set. This can be accomplished using the following steps or procedure: (a) extract the footstep plan, step phase angles, task-space trajectories, and approximate walking path for each example animation; (b) optimize the footstep planner parameters to minimize the error between the original and computed footstep plans with the approximate walking path as input; and (c) optimize the trajectory generator parameters to minimize the task-space error between the original animations and the replanned trajectories with the extracted footstep plan and step phase angles as inputs.

In practice, it may be beneficial to combine both parameter selection methods. For example, this may involve hand tuning the desired gait parameters following an optimization-based fit. Once a parameter set has been defined that encodes a desired walking style, the proposed gait planner can also be used as an animation authoring tool. In this use case, the animator creates an animation curve representing the desired walking path, and the parametric planner is used to generate a complete character animation in the specified style. The animator is then free to modify the resulting joint-space or task-space curves to finalize the animation.

As noted above, motion control may be used to track animation tasks using a whole-body controller (such as controller 760 of FIG. 7). The proposed system relies on a whole-body controller to track traditional and/or procedurally-generated animation trajectories while maintaining balance. Traditionally, animation content is stored as a sequence of frames containing the desired joint positions for a robotic character. Additional channels may also be included to annotate auxiliary states such as the current contact status for each foot. In order to track an animation using a controller, a collection of task-space trajectories is first extracted from the joint position/velocity/acceleration and auxiliary state data. This is accomplished using a rigid body model of the robot actor.

Example motion tasks may include: (a) footstep plan (the upcoming foothold poses and contact switching information); (b) centroidal momentum trajectory (the linear and angular centroidal momentum and rates); (c) Cartesian Trajectories (the pose and twist of selected rigid bodies, e.g., pelvis, swing foot, and so on); and (d) joint-space trajectories (the position and velocity of selected joints, e.g., arm, neck, and so on). The collection of motion tasks can be viewed as an alternate representation or transformation of the original animation data, which may be streamed in real time or queued as inputs to the whole-body controller. This representation allows the controller to prioritize, adjust, and/or ignore each task to minimize the overall tracking error while ensuring that the whole-body motion is dynamically feasible. In practice, the reference pelvis translation and linear momentum trajectories are typically ignored to avoid over-constraining the controller. An online dynamic planner is used to compute a feasible center of mass trajectory considering the current state and upcoming footstep data.

In some preferred embodiments, the whole-body controller 760 includes a state estimator, a high-level controller, an inverse dynamics solver, and a low-level controller. The controller relies on a state estimator to compute the full state of the robot at each time step using the data from onboard encoders, inertial measurement units, and/or strain sensors. This includes the position and velocity of each articulated joint, the pose and twist of the 6 DOF floating-base joint, and external contact forces. The estimate is used to stabilize the robot through the state feedback.

The high-level controller includes a state machine responsible for dynamic planning, contact switching, balance maintenance, gain scheduling, and reactive behaviors such as fall recovery. Desired motion tasks are tracked using Cartesian and/or joint-space feedback controllers that compute spatial acceleration and/or momentum rate-of-change commands. The momentum rate of change and acceleration objectives from the high-level controller are resolved using an optimization-based inverse dynamics solver. This component computes a set of joint accelerations, torques, and external contact forces that minimize a cost function representing the total objective error subject to the dynamic constraints. The cost function is weighted to achieve a soft prioritization of objectives. The desired joint accelerations and torques from the inverse dynamics solution are passed to a low-level controller that computes the desired actuator effort using closed-loop position, velocity, and/or torque control.

At this point in the description of the new robot actor, it may be useful to provide an overview of hardware components and volumetric constraints that may be used in a robot designed to bring numerous characters to life. Unlike many industrial robot designs, the hardware design criteria used by the inventors were not based on the ability to lift a maximum load or repeat a single repetitive function. Instead, the guiding principles were driven by creative demands including achieving the illusion of life or personality through pantomime by bringing a digital or animated character to life through engineering. The primary and unique goals for the hardware design process were to provide a true-to-character appearance and a true-to-character performance.

With regard to a true-to-character appearance, the platform or robot was designed to scale such that it may be themed as a character. This places strict volumetric constraints on the mechanical and electrical design that far exceed the packaging challenges found in typical robotic applications. With regard to a true-to-performance, the platform or robot was also designed to be capable of achieving the expression of a wide range of character emotions and movements. This includes slow and deliberate motions, fast and dynamic sequences, and anything in between. As such, the actuator and mechanisms that drive each joint were chosen and configured to be capable of achieving the necessary joint range of motion, speeds, accelerations, and torques to track each animation sequence required for a performance. Further, the structural design and sensor selection were designed to support dynamic balance and robust whole-body control to allow the character to navigate and interact with the world. The character's motion was also designed to appear life-like rather than being robotic in nature.

For a high-performance robotic actor, the requirements of the structural components and mechanisms exceed those of a typical robot. Some of the important design goals include stiffness, mass, and heat transfer. Particularly, the structure should exhibit a high degree of stiffness evaluated from the loads derived from the simulations and animations described in the hardware high level requirements above. The deflection due to load should not exceed any parameters that would affect control or response of the robot controller. For example, the deflection in the leg should not affect the tension in the belt enough to modify the response. The mass of the structure should be as low as possible, which provides a number of advantages. First, the required energy to actuate the joint is decreased. Second, keeping the stiffness high and mass low, it will also increase the fundamental or natural frequency of the system. With regard to heat transfer, due to the integrated packaging required for the robot, the structure also is preferably configured to be the method for removing generated heat from the robot. The structure was designed to allow the robot to walk and/or animate continuously without any component reaching beyond its thermal limit.

Now, it may be useful to address unique actuator requirements for the robot actor. Designing a robotic actor capable of portraying two or more (or even up to fifty or more) characters places very high demands on the choice of joint actuation. In order to allow the character platform or robot to move in a manner that conveys the illusion of life, there are several actuator design goals that should be met including high speed, high torque density, high torque bandwidth, high back-drivability, and high durability.

With regard to high speed, natural human gaits often display joint speeds that exceed the peak output velocities of many COTs actuators used in industrial applications. The adult human knee can exceed 12 rad/s, and peak joint speeds typically increase as body size decreases. In order to accurately portray human-inspired animations, it is desirable that the robot's actuators are able to achieve human or even superhuman speeds. This ability to track high-speed animation content complicates the actuator design process by effectively limiting the maximum gear ratio that can be used to achieve the necessary continuous and peak joint torques for the full range of desired motions.

Turning to high torque density, in order to support accurate character theming, the dimensions of a robot actor fit within the desired figure profile. This drives a need for low volume, high torque density actuators that can be packaged in restrictive profiles while supplying the relatively high torques required to track dynamic motions. In particular, the motor and gearbox were carefully selected to balance a number of design tradeoffs. Larger motors can be used to increase torque but at the cost of higher volume and weight. Likewise, higher gear ratios can be used to increase torque but at the cost of decreased speed. Because the continuous output torque is a function of motor winding temperature, good thermal management was built into the new robot to meet the desired torque requirements using a suitably-sized motor and gear set.

With regard to high torque bandwidth, control systems for legged robots typically assume that each actuator can be modeled as an ideal torque source. As such, the actuator should be able to accurately track a desired reference torque. The control bandwidth of the actuator torque controller is an important factor affecting the stability of the whole-body control. The torque bandwidth is determined by a number of factors including mechanical, electrical, and control-related design choices. From a mechanical perspective, the open-loop torque bandwidth is directly related to the reflected inertia and series stiffness of the actuator stack-up. In general, a lower rotor inertia, a lower gear ratio, and a higher component stiffness will contribute to improved control performance. From an electrical and control perspective, it is often helpful to measure the output torque directly to shape the actuator response and compensate for friction torques through closed-loop control.

Regarding high back-drivability, an efficient, back-drivable transmission is especially desirable for torque-controllable actuators that lack an elastic element in series with the load. A low friction, low reduction gearbox simplifies the design of the closed-loop torque controller, helps to reduce shock loads due to impacts, and can improve overall safety when interacting with humans. As to high durability, a robot actor should be able to function reliably for months or years at a time. As such, the target actuators are typically designed using components with high cycle ratings for long term operation. Because legged robots are routinely subjected to impact loads during locomotion, it is often beneficial to include a mechanical clutch to provide overload protection for the gearbox and other internal parts. This further complicates the design of the robot actor given the strict volume constraints.

To create a self-balancing robot actor platform or robot actor, the inventors developed a unique creative-driven design approach that draws from extensive experience expressing the illusion of life through motion. The breadth of digital and animated characters created to date serves as a useful starting point. First, the inventors realized that it was critical to design the hardware platform around world class character performances rather than retroactively designing the performance around a hardware platform that falls short of the creative requirements. Traditionally, the hardware requirements for a new robotic figure are finalized after analyzing one or two targeted animations. Because a robot is designed to be capable of expressing a wide variety of AI-driven performances, a novel process was needed to derive the necessary mechanical and electrical design requirements. The result was a creative-driven design approach that is not specific to any one character or to one robot design.

The following eight steps provide a high-level overview of one exemplary creative-driven approach for designing a robot actor. As a first step, a short list of potential roles is identified for the target robot actor platform. Due to physical constraints, this typically represents a group of similarly-dimensioned characters that could be portrayed by a single physical robot, e.g., a group of characters with a size within a relatively small range (such as about 1 meter in height). As a second step, a simple character animation rig is built using any useful animation tool (e.g., Maya or the like), and a suite of potential scenes for the actor are crafted. The rig allows an animator to define physical joint locations and the DOFs needed to portray all the emotions and movements of the selected character(s). As a third step, a simple joint-space rigid body model is created of the robot actor using the kinematic information from the animation rig and approximate inertial data.

As a fourth step, a rigid body simulator is used to analyze the example animation content and to compute required joint torques, speeds, accelerations, and internal/external forces. This step may include using a simulator environment to display robot tracking animation content to the operator/designer/animator (e.g., using a whole-body controller in a simulation environment and providing screenshots of the character executing animations in a rigid body simulation environment). As a fifth step, a mechanical design concept is developed that approximates the kinematic and inertial properties of the preliminary rigid body model. The transmission and motor requirements to actuate each DOF using various mechanism types are analyzed, and a set of joint mechanisms are down-selected. The inventors performed this step for a small robot actor with the analysis including generating a motor speed-torque histogram that was used to inform the mechanical design (with the data for the histogram obtained using rigid body simulation and mechanical analysis).

As a sixth step, the rigid body model is updated, and a refined animation rig is built based on feedback from the mechanical design team. For example, a skeletal animation can be generated that combines a rig (that is designed to match the kinematics of the actual robot) with a mesh for a chosen character. As a seventh step, dynamically-feasible animation content is generated for the updated character. The animator may be assisted in this process by an animation plugin that provides physics-based feedback such as visualization of the support polygon and center of pressure trajectory. As an eighth step, the fourth through the seventh steps are repeated using the new animation content. This final step may include continuing to iterate the animation, simulation, and mechanical design cycle until the hardware meets the desired creative requirements.

With the design process understood, it may now be useful to describe one exemplary robot actor that was designed using this design process. The prototype robot actor was a 1-meter tall, self-balancing, bipedal hardware platform developed to portray a small character (e.g., for a theme park or other application). The robot actor applies the topics discussed previously, and the following is a description of the specifics of the resultant high-level, structural, and actuation designs. This discussion is then followed by the animation process used to generate animation data/scripts to control this prototyped robot actor and the unique challenges of the specific robot design.

Figure 9:
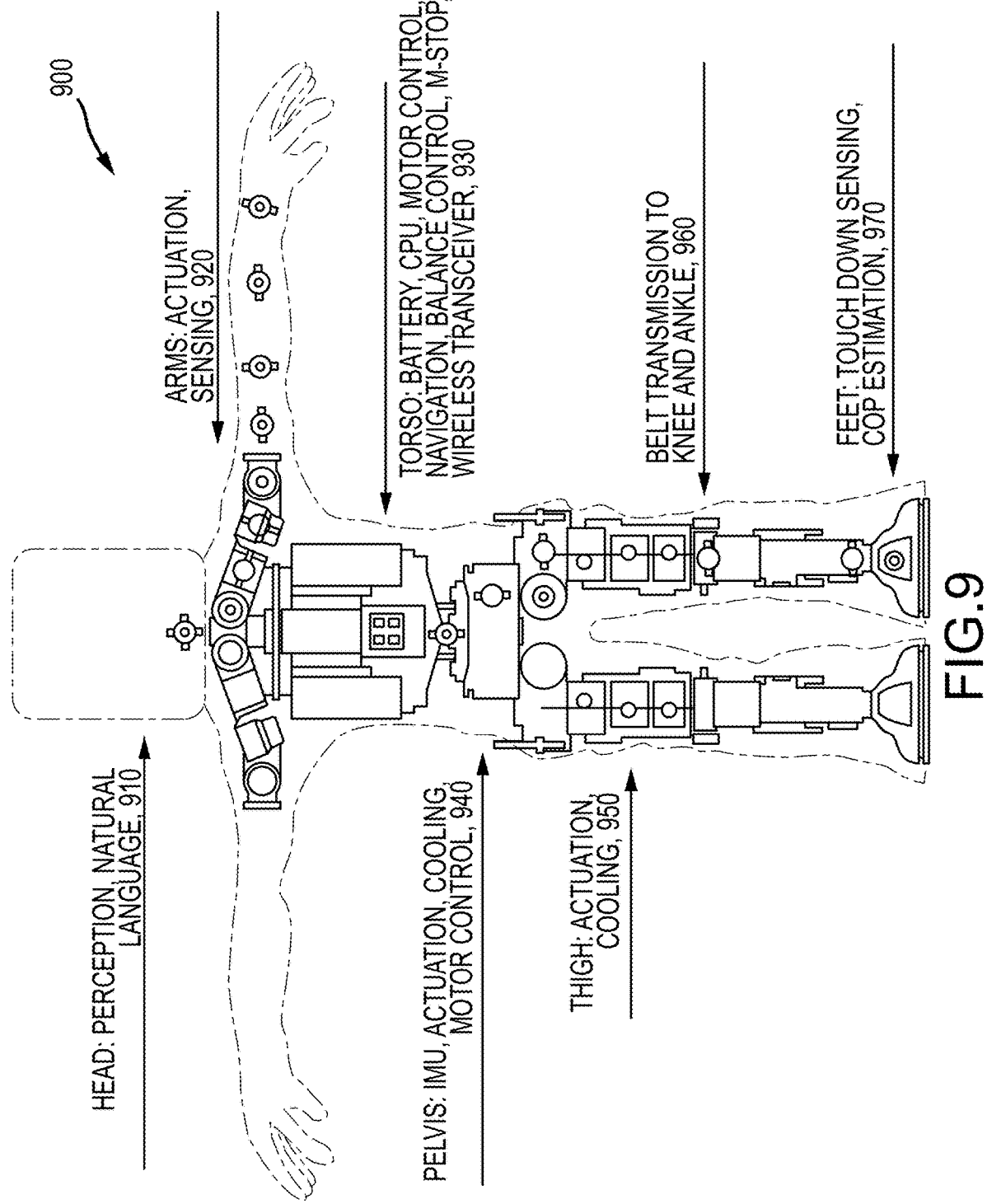
FIG. 9 illustrates a front view of a bipedal robot actor of the present description showing high-level hardware design components.

FIG. 9 is a front view of a bipedal robot actor 900 that was designed as taught herein, and FIG. 9 is intended to illustrate the high-level hardware design components of the robot 900 covered by an outer layer or skin 905 (which is chosen to suit the character the robot 900 is acting out or bringing to life). These components include: (a) a head and neck assembly (providing perception and natural language); (b) an arms (and, optionally, hands) assembly 920 (providing arms, actuation, and sensing); (c) a torso assembly 930 (torso structure/housing, battery, CPU, motor control, navigation, balance control, m-stop, and wireless transceiver); (d) a pelvis assembly 940 (pelvis structure/housing/body, IMU, actuation, cooling, and motor control); (e) thigh assemblies 950 (thigh structure/housing/body, actuation, and cooling); (f) belt transmission assemblies 960 (belt transmission to knee and ankle); and (g) foot assemblies 970 (foot structure/housing/body, touch down sensing, and COP estimation).

For safety and performance reasons, the robot 900 was built to target a height of one meter and a group of target character performances were selected that suited this target height. As a guide, the inventors built a generic character animation rig (in Maya) that was capable of representing any of the target characters. A suite of acted scenes and human interactions was then crafted. The lower body dimensions of the robot 900 were chosen by scaling life size paper cutouts and 3D prints of a digital model of one of the characters from the target group, and it will be noted that the character's scale in film was too small both for typical mechanical design and for real world presence. Once the appropriate scale was set, lower body joint locations were placed in the model. The smallest number of DOFs were used that would adequately express the character in animation, which different from standard humanoids. In some areas (e.g., torso pitch, scapula yaw, and the like), functions were eliminated while in other areas functions were added (e.g., fourth shoulder rotation axis).

While attempting to track high quality arm animations with different shoulder kinematic layouts, the inventors discovered that it was not practical to achieve enough dexterity with a 3-axis shoulder mechanism to deliver a lifelike performance. Dexterity refers not only to the ability to achieve poses in the animation, but it also refers to the ability to transition between poses with a natural arc of motion. In a 3-axis mechanism, problems occur when the second axis rotates into a position where the first and third axes are aligned. The mechanism then loses a degree of freedom, also known as being "gimbal locked." In a traditional 3-axis animatronic shoulder, this phenomenon creates "singularity" regions that the arm cannot travel through without extreme difficulty. Previous solutions to this problem were to angle the shoulder mechanism backwards, thus moving the singularity region to an area where the arm is less likely to travel.

The inventors found that for maximum dexterity, it was desirable to eliminate singularity regions altogether by introducing a fourth axis of rotation. Because this makes one of the four axes redundant for some arm poses and animators author content in a 3-axis space, the inventors developed an inverse kinematics solver that remaps three rotations (X, Y, Z) to four rotations (W, X, Y, Z) without gimbal locking. Further, it may be useful in some cases to provide a dexterity rating system that can be used to evaluate any shoulder mechanism. This can provide a single numerical value expressing the dexterity capability of a shoulder.

The legs and feet from the film model were converted to CAD surfaces to provide volumetric constraints for the robot design. The upper body dimensions were chosen by scaling similarly sized characters from the target group to match the existing lower body design. Overall height and upper body joint locations were selected that would accommodate the most characters and provide a worst-case scenario for packaging. The choices of joint rotation order were also creatively driven. For the torso, it is easier for an animator to rotate the yaw function before the roll.

With regard to structural design, starting with a range of characters standing around one meter tall, one of the most difficult hardware problems was condensing all the components desired to create a robot actor while staying within the targeted character's silhouette. Non-traditional design approaches had to be utilized to stay within these physical dimensions. Emulating nature helped the inventors seek a solution that would help overcome this packaging challenge, and this design approach is known as biomimicry.

Using biomimicry as a core to the design process, the inventors looked at the packaging of muscle groups of bipedal mammals and recognized that a common trend or thread ran throughout. It was discovered by the inventors that bipeds house the majority of their muscles for providing the power for the major pitch axis of the legs so as to be located in the upper portion of the thigh/femur. This allows the center of gravity of the biped to be much higher so as to making it easier to balance but also so as to allow the lower end of the leg to be much lighter. This allows the end affector (foot) to have a lot less inertial, which allows the foot to be able to be accurately placed at very high speeds.

To follow this methodology, a different approach had to be used from a mechanical engineering perspective. Today's standard of bipedal locomotive robots position the actuators directly in line with the joint it controls to provide direct drive. This does allow simpler mechanisms and fastening methods to be used, but the torque and speed required to do so also requires a frame size motor that, if both the speed and torque met the requirements of the planned robot actor, would have a size falling vastly outside the physical silhouette of the intended character. The main engineering feats used to accomplish these tasks were greatly contributed by two main factors: (a) consolidating mechanical parts within the thigh structure; and (b) providing a reversing biarticular knee assist mechanism.

With regard to the reversing biarticular knee mechanism, biarticular muscles are muscles that cross two joints in series (usually in a limb) and that play a large role in determining muscle function. Biarticular muscles function to link the action to muscles along a fixed length limb so that the work of a powerful mono-articular muscle can also be transmitted to a different extremity. This allows the muscle to deliver power to another joint without changing the angle of the joint itself. In humans, the gastrocnemius muscle is a superficial two-headed muscle that attaches to the upper part of the knee, crosses over the knee joint, and attaches to the rear portion of the heel. The flexing of this muscle during walking/running and bending of the knee creates traction on the femur, which applies a moment on the tibia in the lower leg and which causes the knee to bend. Hence, a muscle that is primarily used for ankle pitch movements also has an impact on the knee movement. The way the gastrocnemius muscle is routed in humans gives the knee a speed increase, which pulls the knee in the same direction that the quadriceps muscles housed in the thigh are pulling the knee in as well. However, in the bipedal robotics world, the knee typically sees the highest torque, and torque is often the main limiting factor for a dynamic robot.

Utilizing this concept of the biarticular knee mechanism, the inventors flipped the direction of the gastrocnemius muscle (belts and pulleys in the case of robot 900), which now utilizes this extra power delivered from the ankle actuator, against the knee, as a torque assist. Trading the once extra speed increase and torque decrease for a speed decrease, torque increase is achieved during the majority of the walking gait for robot 900. This now gives the additional torque needed at the knee joint that will allow the platform 900 to be able to continually deliver on these highly animated performances.

FIG. 10A illustrates a portion of a human leg 1000 showing the leg's components along with gastrocnemius muscle routing. FIG. 10B illustrates a robot leg 1010 that may be used in a robot actor (such as robot 900) of the present description and illustrates use of reversed gastrocnemius muscle/belt and pulley. FIGS. 10A and 10B are useful for illustrating the similarities between the human gastrocnemius and the proposed biarticular knee assist mechanism in the robot actor. As shown, the robot leg 1010 includes a thigh or upper leg assembly 1020 coupled (at knee joint 1030) with a calf or lower leg assembly 1040. The upper leg assembly 1020 includes a hollow housing or body 1022 that houses a hip pitch actuator and joint 1024 (for coupling with a pelvis not shown in FIG. 10B), a knee pitch actuator 1026, an ankle pitch actuator 1028, and a knee joint 1030. The lower leg assembly 1040 includes a hollow housing or body 1042 that houses an upper pulley 1043 near the coupling with the upper leg assembly 1020 at the knee joint 1030 and also houses an ankle joint 1044. In addition to knee drive belt 1050, the leg 1010 includes a pair of belts 1052 and 1054 that extend from the upper leg housing 1022 into the lower leg housing 1042 and are positioned/configured to provide reversed gastrocnemius as shown.

FIGS. 11A-11C provide further detail of the robot leg 1010 of FIG. 10B with an isometric view, a transparent isometric view, and a transparent side view (opposite side as shown in FIG. 10B), and these figures are useful for providing a mechanical overview of the powertrain. The main leg powertrain includes four main DOFs. Hip pitch is direct drive with actuator 1024, knee pitch (belt 1050) and ankle pitch (belt 1054) that are belt driven, and ankle roll that is also directly driven. The ankle drive train is provided with two belts in series, with one that drives power to and around the knee and another housed inside the calf housing 1042 that reverses the ankle pitch direction.

Figure 12A:
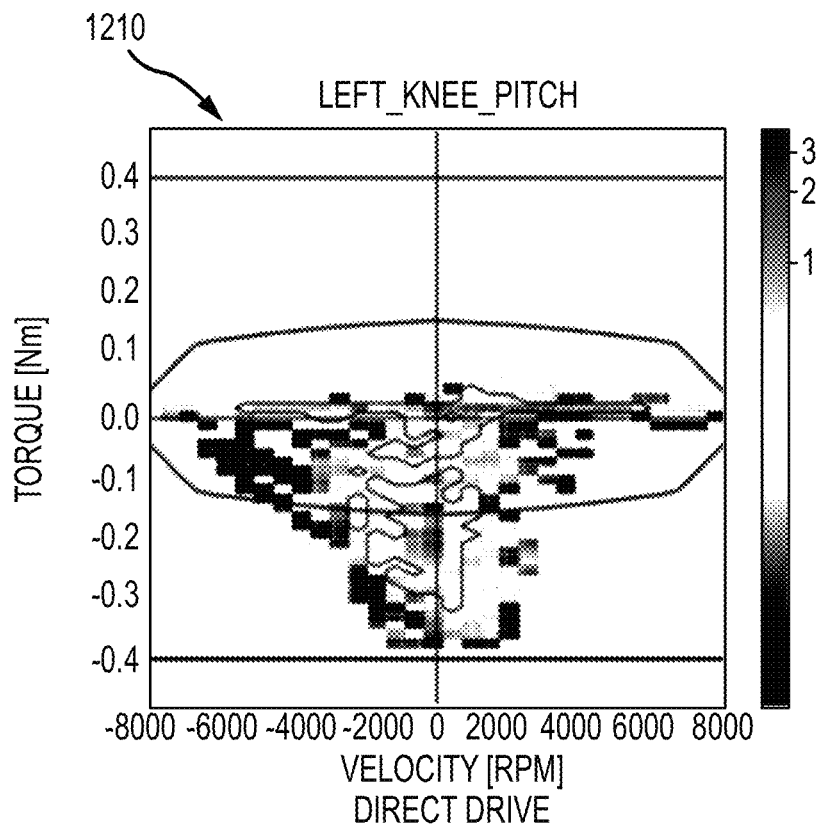
FIGS. 12A-12C illustrate speed-torque histograms for direct-drive, biarticular, and reversed biarticular mechanisms, respectively.
Figure 12B:
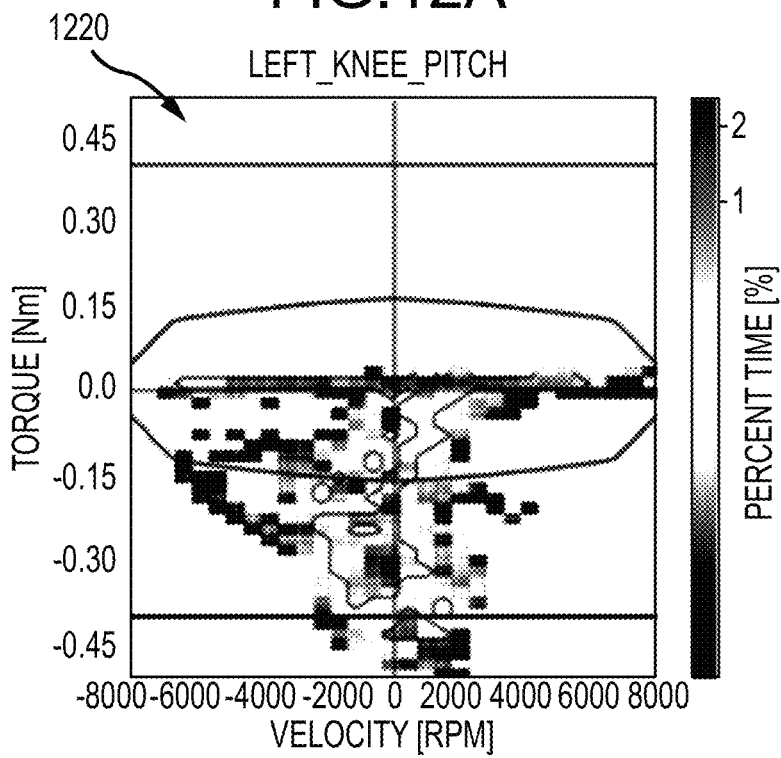
Figure 12C:
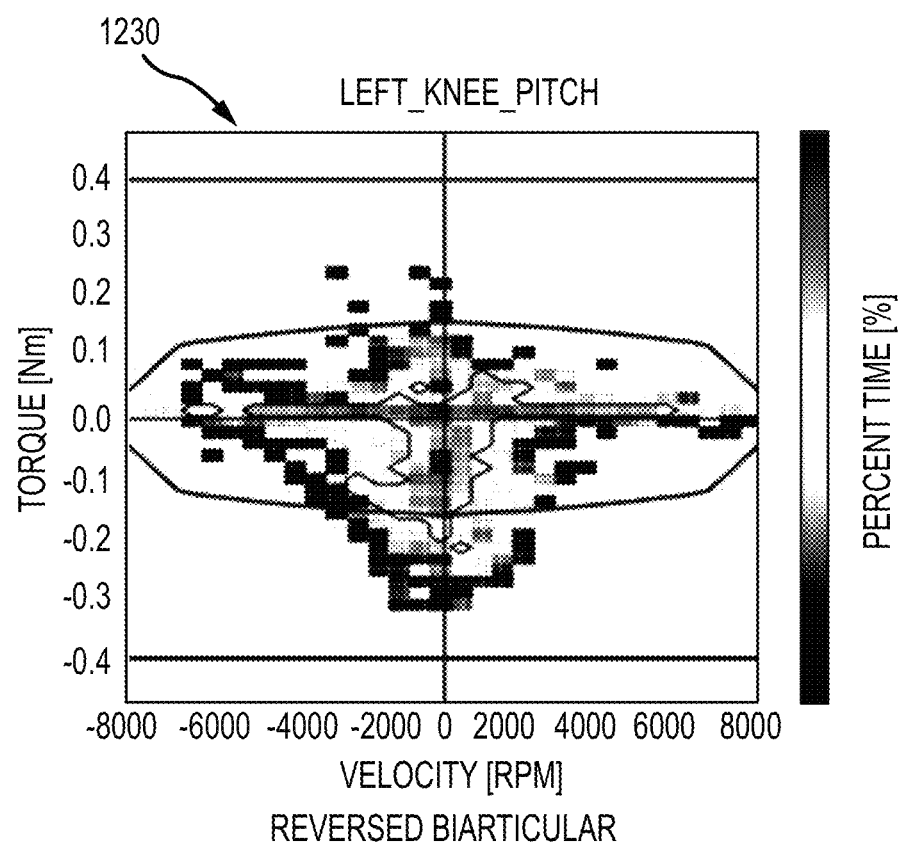

FIGS. 12A-12C illustrate speed-torque histograms 1210, 1220, and 1230 for direct-drive, biarticular, and reversed biarticular mechanisms, respectively. The X-axis represents motor torque (Nm), the Y-axis represents rotor speed (RPM), and the shading of each individual square represents the percent time that those measurements are required across an entire animation. Anything falling inside of the oval shaped line indicates the positive and negative torques/speeds met by the continuous limits of the new actuator created for the robot actor (and described below). The top line indicates the positive peak torque and the bottom line represents the negative peak torque of the actuator. The histograms 1210, 1220, and 1230 show the speed and torque requirements for the direct-drive, biarticular, and reversed biarticular mechanisms across an entire range of animations. Having the majority of the speed/torque requirements fall within the continuous range of an actuator has many advantages. One of the main reasons is the amount of heat generated from the motor with direct relation to the amount of torque/speed demanded. The reversed biarticular mechanism houses the majority of the speed/torque requirements falling within the continuous limit of the new actuator, making it a very desirable actuator choice for the leg of the robot actor.

Mathematically speaking, the joint torques, $\tau_{knee\_joint}$ and $\tau_{ankle\_joint}$, for the biarticular knee assist mechanism can be defined as:

$$\tau_{knee\_joint} = \tau_{knee\_actuator} + \tau_{ankle\_actuator}$$

$$\tau_{ankle\_joint} = -\tau_{ankle\_actuator}$$

Solving for the individual actuator torque, $\tau_{knee\_actuator}$ and $\tau_{ankle\_actuator}$, we have:

$$\tau_{ankle\_actuator} = -\tau_{ankle\_joint}$$

$$\tau_{knee\_actuator} = \tau_{knee\_joint} + \tau_{ankle\_joint}$$

Note that during the support phase of the walking cycle, the knee torque typically remains negative, i.e., $\tau_{knee_{joint}} < 0$, to prevent the knee from collapsing under the weight of the body, while the ankle torque remains positive, i.e., $\tau_{ankle_{joint}} > 0$, such that the center of pressure lies forward of the ankle joint near the center of the foot. Additionally, the magnitude of the torque applied to the knee is typically greater than at the ankle, i.e., $|\tau_{knee\_joint}| > |\tau_{ankle\_joint}|$. Using the biarticular mechanism, these conditions imply that:

$$|\tau_{knee\_actuator}| = |\tau_{knee\_joint}| - |\tau_{ankle\_joint}| < |\tau_{knee\_joint}|$$

$$|\tau_{ankle\_actuator}| = |\tau_{ankle\_joint}|$$

Thus, the upper actuator applies a torque with a magnitude less than the knee while the lower actuator applies a torque with a magnitude equal to the ankle. Hence, the knee is effectively assisted by the actuation of the ankle as seen by:

$$\tau_{knee\_actuator} = \tau_{knee\_joint} + \tau_{ankle\_joint}$$

To keep within the strict physical dimensions of the intended character, the mechanical design was greatly optimized. To achieve such condensed packaging, metal 3D printing was used in one prototype to take advantage of organic and complex shapes that would be otherwise very difficult to machine in traditional ways. The thigh or upper leg structure is the main housing for all the high torque, high speed, DOFs actuators of the walking platform. It houses all three main pitch axis actuators: hip pitch, knee pitch, and ankle pitch.

Figure 13:
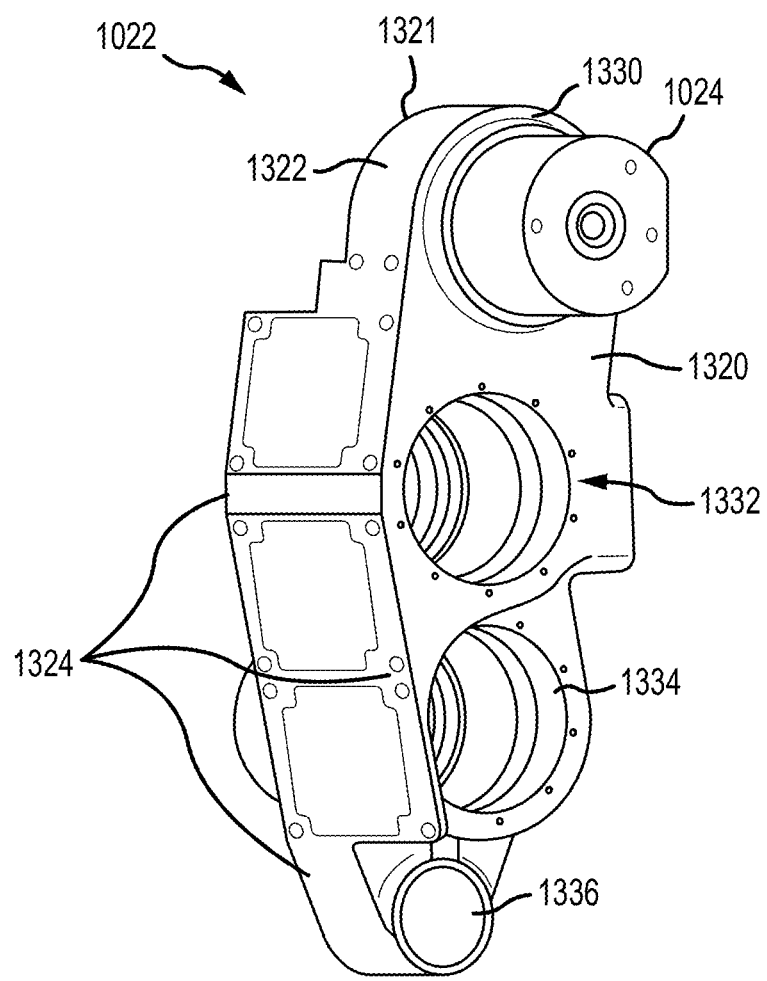
FIG. 13 is a perspective view of a thigh structure or housing prior to installation of knee and ankle pitch actuators.

FIG. 13 illustrates the thigh or upper leg housing 1022 of the robot leg 1010 of FIG. 10 prior to insertion of several of the actuators and/or pulleys. As shown, the housing/body 1022 is made up of front and rear panels or walls 1320 and 1321 spaced apart by a sidewall 1322, and the three of these walls 1320, 1321, 1322 enclose an interior space (e.g., where belts may be run). Channels or shafts 1330, 1332, 1334, and 1336 (which may be cylindrical as shown) extend through the housing/body 1022 from the front panel/wall 1320 to the rear panel/wall 1321, and these are used to receive and retain the hip pitch actuator and joint 1024, the knee pitch actuator, the ankle pitch actuator, and the knee joint, respectively. Further, the sidewall 1322 includes a plurality of spaced apart sets of apertures or openings through which cooling air may be drawn or pass into the interior space of the housing 1022 and through which hotter exhaust air may be forced or passed out of the interior space of the housing 1022.

Figure 14A:
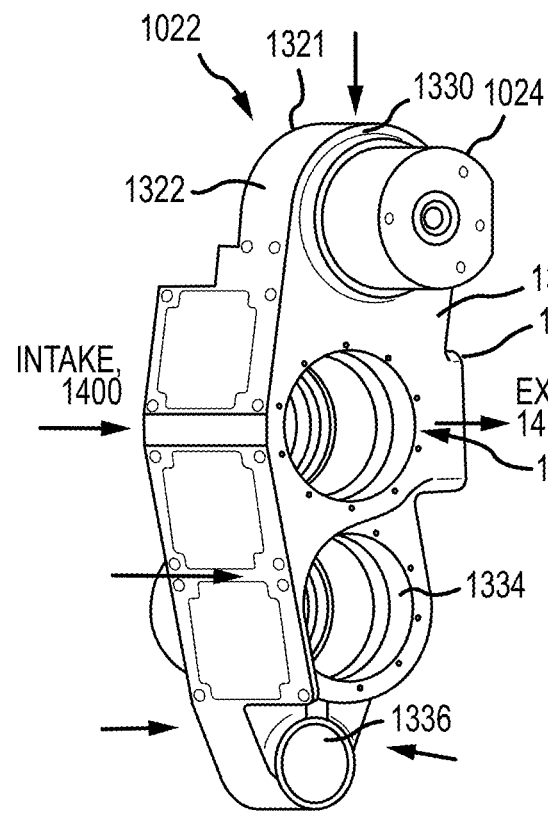
FIGS. 14A-14C show an air intake and exhaust schematic of the thigh structure of FIG. 13, a transparent view of the thigh structure of FIG. 13 showing internal cooling air flow, and a cross sectional view of the thigh structure of FIG. 13 showing stacks of heat exchanger or cooling fins defining air flow paths or a plenum between and around actuators.
Figure 14B:
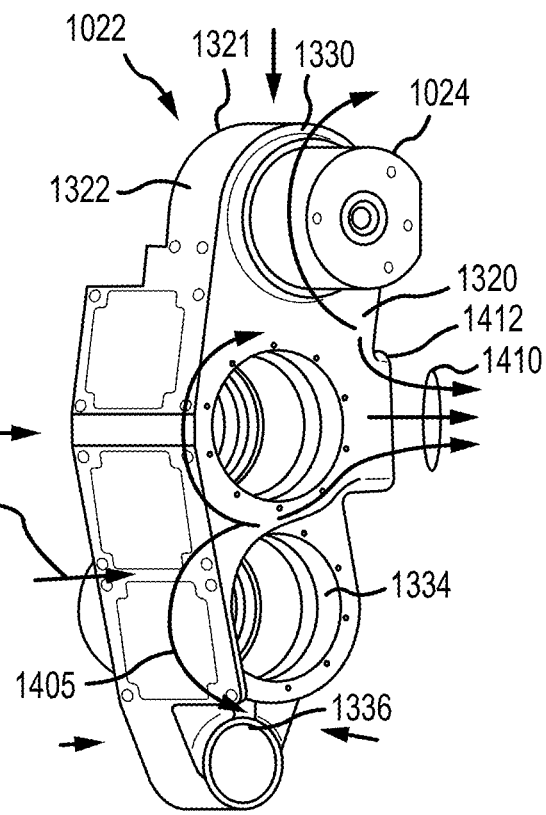
Figure 14C:
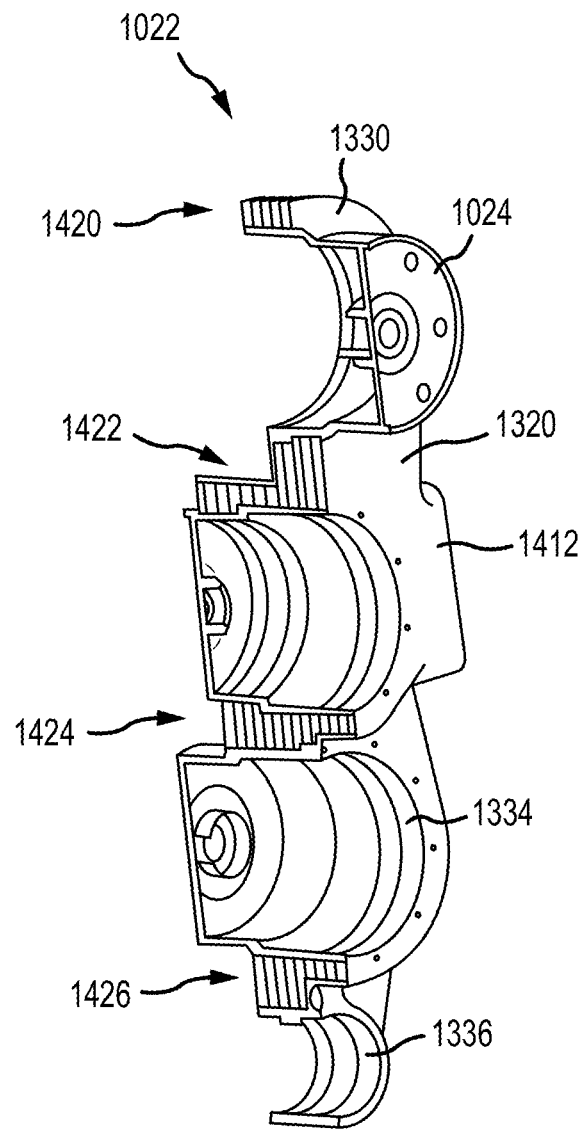

The one-piece (or unitary) thigh housing 1022 acts as a main contributor to the following three components: (a) the weight bearing femur structure itself; (b) the motor housings for all the pitch joint actuators; and (c) a heat exchanger for the potted motor windings (stators). FIGS. 14A-14C are useful for showing the heat exchange functionality of the housing 1022. FIG. 14A shows that intake air 1400 enters the interior space/core of the housing 1022 via the inlet apertures/openings 1324 and, after cooling of the stators occurs, hot exhaust air 1410 is output via an air outlet or exhaust opening(s) 1412 located on the opposite portion of the sidewall 1322 (e.g., centrally located and/or adjacent the channel or passageway 1332 for housing the knee pitch actuator).

FIG. 14B is a transparent view of the housing 1022 showing the cooling air flowing (as shown with arrow 1405) within the interior space or core of the housing 1022 over and around the stators of the actuator channels/passageways 1330, 1332, 1334, and 1336. FIG. 14C is a sectional view that shows that a stack of spaced apart planar (or ridged/waved) fins 1420, 1422, 1424, 1426 may be provided between the front and rear walls/panels 1320, 1321, with the fins defining plenums between them (e.g., with a fin spacing in the range of 0.1 to 0.25 inches) and extending across the entire width (in some embodiments) of the housing 1022 to define a plurality of parallel air flow paths.

As can be seen, the entirety of the core or interior space of the thigh structure/housing 1022 is almost completely hollow. The only material that lies inside are integrated cooling fins that surround all three pitch motor stators (when inserted). These fins act as the heat exchanger (along with the sidewalls defining the channels/passageways 1330, 1332, 1334, and 1336), which allows the stator to efficiently transfer its generated head into the thigh structure itself. Now, instead of being just a weight bearing femur structure that houses the motor windings, the housing 1022 is also a thermal mass as well that allows the structure to exchange the heat into the atmosphere very effectively. The hollow areas of the thigh structure/housing 1022 between the fins allows not only the thigh to be both stiff and light but also are utilized as the air plenum for the hot air generated from the potted actuators to be circulated out of the structure/housing 1022.

With regard to electrical integration, the mechanical aspects of the design of the electrical components also needed a unique design to meet the packaging requirements. Flexible rigid circuits were used to reduce the amount of wired through the robot, as electrical interconnects are the primary failure mechanism in any robotic figure. The flexible rigid circuit boards wrap the structure in a way that is reminiscent to origami, with almost every usable part of the surface area used for all the necessary electrical components.

Figure 15:
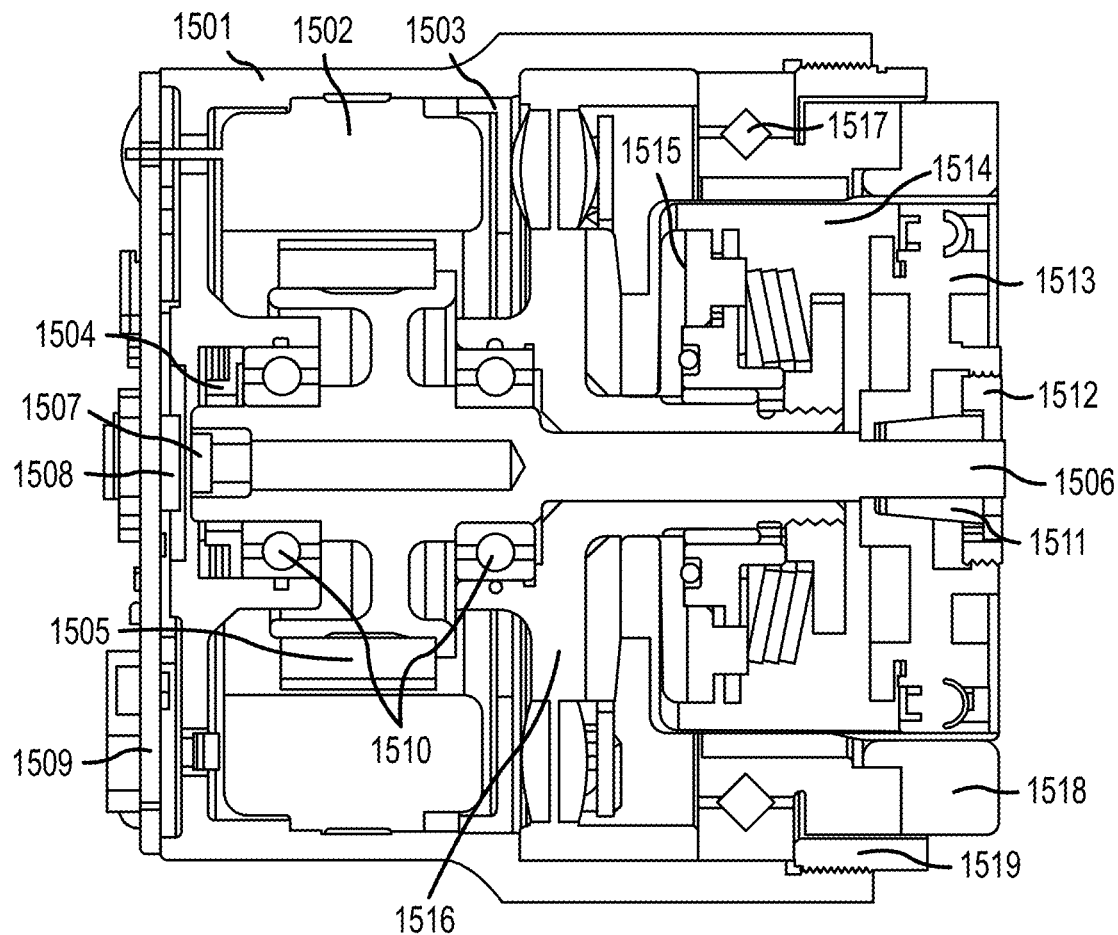
FIG. 15 is a cross sectional view of an actuator of the present description that is useful to implement the actuators of the robot actor such as for installation into the thigh structure of FIG. 13.

The inventors determined that, as the market stood at the time of their invention, there was not a single off-the-shelf actuator available that could meet the actuator requirements discussed previously. Even more limiting was trying to fit the highly specialized actuator into the space available (such as in the thigh housing) to allow this robot to be a platform for a variety of characters. The solution for one exemplary robot actor was for the inventors to engineer a completely custom actuator from the ground up that was specifically tailored to this application. FIG. 15 illustrates a cross section of an actuator 1500 that may be used for the actuators of the robot actor such as for actuators 1024, 1026, and 1028 of FIG. 10.

The actuator 1500 contains many individual components that were carefully engineered to enable the present platform/robot to perform as a capable actor. As shown, these component include: a housing 1501, a stator 1502, a thermal cap 1503, a space and preload spring 1504, rotor magnets 1505, a rotor shaft 1506, an encoder magnet 1507, an encoder chip 1508, a rear PCB 1509, preloaded bearings with O-rings 1510, a shaft taper lock 1511, a wave generator lock nut 1512, a wave generator 1513, a flex spline 1514, a clutch assembly 1515, a torque cell 1516, a cross roller bearing 1517, a circular spine 1518, and a bearing lock ring 1519.

The housing 1501 of the actuator 1500 serves as both the main structural carrier of the actuator 1500 and the method for removing generated thermal energy/heat from the system. In FIG. 15, the housing 1501 is a standalone part. This was done during the testing phase of the project to refine and test the design of the actuator 1500. In actual use, the housing 1501 of the actuator 1500 may be directly integrated into the structural joints (or receiving channels/passageways) of the robot. The use of the structural joint of the robot as the housing 1501 can be a key factor in the design of the robot as it eliminates a thermal joint, reduces part count, and greatly reduces the overall size of the robot's joints. Reducing the number of thermal joints is also desirable as a thermal joint will also increase the path of thermal dissipation. Although a thermal grease can be used to reduce air gap and decrease thermal resistance, such grease typically is never as efficient as the base metal itself 3D printed housings have been made of metal (e.g., AlSi10Mg aluminum or the like) for improved thermal conductivity through the housing 1501 to adjacent/mating cooling fins (as discussed above).

The stator 1502 can be hand wound motor housing for maximum efficiency. The stator 1502 is also preferably potted into place such as with a high conductive thermal epoxy. The use of a potting epoxy is useful to ensure mechanical retention as well as conduct generated heat out of the system. Air acts as an insulator so it is desirable to fill any of those gaps to decrease the thermal resistance of the system. Decreasing thermal resistance allows the motor to run at a higher continuous torque once the system reaches a thermally steady state. The thermal cap 1503 can be designed to improve thermal management by reducing thermal resistance and increasing thermal efficiency. As much as twenty percent of the heat loss of the stator 1502 is through the face the thermal cap 1503 rests against. The gap shown in FIG. 15 between the thermal cap 1503 and the stator 1502 is preferably filled with potting epoxy to eliminate any air gap due to tolerance stack in the system. The thermal cap 1503 is typically made of metal with one embodiment suing aluminum (e.g., 6061-T6 aluminum) for enhanced thermal conductivity while not creating thermal expansion mismatch. The thermal cap 1503 is essentially a thermal pipeline from the front of the stator 1502 to the housing 1501 to remove as much thermal energy from the system as practical. The potting epoxy may be any useful epoxy such as a type that is highly thermally conductive, e.g., a thermal conductivity of at least 1.3 W/m/C. The potting epoxy bonds the stator 1502 to the housing 1501, the thermal cap 1503 to the stator 1502 and the housing 1501, and the rear PCB 1509 to the housing 1501. It is used as a tolerance gap filler as well as an air gap eliminator to increase thermal efficiency.

The spacer and preload spring 1504 are used to properly preload the rotor bearing 1510 while reducing any tolerance gap. The preload spring 1504 is also used to soak up any generated axial load from the harmonic drive gearbox. If the axial load of the harmonic drive was not soaked up by the spring 1504, it could potentially damage the ball bearings or reduce efficiency of the rotor magnet 1505/stator 1502 combination. The rotor magnets 1505 may be implemented as a ring of very powerful magnets used that are used to translate electromagnetic forces from the stator 1502 to the rotor shaft 1506.

The rotor shaft 1506 is the main component transferring torque from the rotor magnets 1505 to the gearbox/taper lock 1511. The rotor shaft 1506 can be a precision machined component made from a metal such as titanium (e.g., Grade V titanium). Titanium is useful for the shaft material as it provides an excellent balance between stiffness and mass. As the rotor 1506 is transferring torque from the rotor magnets 1505 to the gearbox, it is desirable that torsional deflection is kept in check and even to a minimum. The inventors performed significant analysis on the rotor shaft 1506 to ensure the stiffness to mass ratio was very high (e.g., as high as possible or at least as practical), with any excess material being removed if it was not significantly contributing to the torsional stiffness of the shaft. The inertia of the rotor 1506 also was designed to be very low (again, as low as possible or at least as practical) to reduce unnecessary energy being used to move the rotor 1506 itself. A rotor with a large inertia could lead to vibration, noise, or an unstable operating condition.

The encoder magnet 1507 is used to provide a contact-less form of measurement of rotational position to the encoder chip 1508. In one embodiment, the encoder magnet 1507 was very small (e.g., 3 mm by 3 mm) and was used to provide the rotational information to the chip 1508 as this allowed the overall size of the actuator 1500 to be reduced. Most off-axis encoder magnets are larger than the overall diameter of many embodiments of the actuator 1500. The encoder chip 1508 functions to translate the magnet information from the encoder magnet 1507 to the rear PCB 1509. The chip 1508 is preferably as small of a footprint as possible to reduce overall size. The rear PCB 1509 on the actuator 1500 is essentially the nerve system of the actuator 1500. It provides the power to the windings of the stator 1502, reads encoder data from the chip 1508, and reads data from the torque cell 1506 that is built into the actuator 1500. Using a rear PCB 1509 allows use of only one customized connector to the actuator 1500 that provides all necessary power and data.

The bearings 1510 are positioned between the housing 1501/torque cell 1506 and the rotor shaft 1506 and are designed to be as efficient as possible. They are lubricated with oil instead of grease in some embodiments to increase their overall rotational efficiency. There typically are no seals to retain the oil to reduce any friction that would be generated by seals. The O-ring in between the outer race and housing 1501/torque cell 1506 is used to remove any tolerance mismatch on the outer diameter as the outer diameter is a slip fit in some cases. Utilizing an O-ring that is compressed is sometimes useful as it maintains the mechanical link while sucking up any tolerance gaps from the bearing slip fit.

The taper lock 1511 is the link in between the rotor shaft 1506 and the wave generator 1513 of the gearbox. It is a consumable part, in some implementations, that is designed to take up as little space as possible. It can be slit to allow performant deformation to allow torque transfer. The wave gen lock nut 1512 is used to lock down and permanently deform the taper lock 1511. A custom tool can be used to tighten the lock nut 1512 which then pushes the taper lock 1511 axially to permanently deform the taper lock 1511 and locks it to both the rotor shaft 1506 and the wave generator 1513. The wave generator 1513, as well as the flex spline 1514, is typically a component of the harmonic drive gear box.

Regarding the clutch assembly 1515, although the output torque of the actuator 1500 is regulated using a closed-loop controller, high transient torques can occur during impact events, which may exceed the rated torque of the gearbox and/or other components in the load path. In these scenarios, the actuator 1500 may lack sufficient current or control bandwidth to accelerate the gearbox at a rate required to suppress the external shock load. For this reason, a mechanical clutch 1515 is preferably used to prevent overload torques by limiting the mechanical energy transmitted through the gearbox. The gearbox design is limited by a ratcheting torque, which could cause permanent damage to the meshed teeth of the flex spline 1514 and the circular spline 1518. If a torque value of the design value is transmitted, the clutch 1515 slips instead of that torque being transmitted. The clutch 1515 works in all directions, and it limits positive and negative torque out of the actuator 1500. It also limits reflected inertial torques generated by the motor and input torques from the world, as might be experienced during a robot fall event.

The clutch 1515 is mechanically fastened to the torque cell 1516 with a pined interface. The clutch 1515 uses, in one non-limiting example, Belleville disk springs to apply an axial preload, which is then used to create a resisting torque with interlocking teeth. The clutch 1515 may utilized 3D printed teeth due to the microscopic size used in some implementations. The number of teeth in the clutch 1515 may vary with one embodiment using sixty-four teeth, with a high number of teeth reducing interface stresses between the clutch teeth as well as reducing axial travel during a slip event. This high pitch tooth profile reduces the angle of travel required to slip, which reduces disturbances to the controller. The tooth profile is also unique in that it provides a smooth continuous line contact during an overload event. This removes the possibility of the clutch teeth plateauing at their peaks. Shims can be used to fine tune the slip torque to the design value, and shims may be useful due to the tolerance stack through the clutch interface. Typically, in most actuator designs utilizing a harmonic drive gearbox, the space where the clutch 1515 is designed is unused, and the inventors have been able to make use of that space with the location of the clutch 1515, which further reduces the overall mechanical footprint of the actuator 1500.

With regard to the torque cell 1516, it should be understood that creating a dynamic robotic figure capable of portraying fluid stylized motions and interacting safely with the environment requires high fidelity joint and actuator control beyond what is typical of the current state of the art. The inventors employed closed-loop torque control to achieve high fidelity and safe motion control. To attain the performance demanded, the inventors relied on output torque sensing, combined with a dynamic model, to control the load torque. There are multiple ways to measure torque through different sensing modalities. Each modality affects the quality of the input in the control loop and overall performance. The sensing technology is also limited by the sensing location in relation to the load path through the structure.

A torque sensor design can be chosen that radially measures shear so it has a radially symmetric response in the directions of applied torque as well as rejecting axial forces. This device uses strain gauge technologies organized in a Wheatstone bridge configuration that provides ultra-high sensitivity, wide dynamic range, differential signaling, common mode rejection, temperature compensation, and calibration flexibility. The differential output of the bridge provides excellent noise rejection and ensures dependable feedback into the low-level high bandwidth control loops. Since it is a high-quality analog device reminiscent of industrial and aerospace applications, the digital interface resolution on hardware will be the limiting factor over the sensor quality, and the sensor will always have the capacity to deliver the desired performance. The torque cell 1516 is located inside the actuator 1500 to further reduce the overall size of the actuator 1500. The torque cell 1516 is an electro-mechanical component in between the clutch 1515 and the housing 1501 of the actuator 1500. The torque cell 1516 uses strain beams to detect strain in the structure. The strain signal is then translated into a mechanical torque value. Either an axial strain or a shear strain can be sensed depending on the mechanical design of the torque cell 1516. This direct measurement of the applied torque allows a greater degree of control as the actuator 1500 and a robot built with the actuator can sense load, which allows it to interact with the environment.

The cross-roller bearing 1517 is in between the housing 1501 and the circular spline 1518. It is the main output bearing for the actuator 1500, and, due to its design, a variety of load conditions can be handled with a single bearing. The cross-roller bearing 1517 is a full complement bearing. Its use in the actuator 1500 is unique in that the output speeds of the bearing 1517 are relatively low. Spacers are typically using in between rollers to reduce friction and increase the available output speed, but these spacers are unnecessary in the actuator 1500 due to the speeds required. Therefore, more metallic rollers can be used, which increases the moment carrying capacity of the bearing 1517. The circular spline 1518 is a component of the harmonic drive gearbox.

The bearing lock ring 1519 is the threaded structuring component that holds the output bearing 1517 to the housing 1501. It can be a fine threaded castellated nut, which allows a great deal of axial pinch force to be applied to hold the bearing 1517 to the structure 1501 while being a relatively small cross-sectional size. In some embodiments, it may be useful to combine the cross-roller bearing 1517, the circular spline 1518, and the bearing lock ring 1519 into a single component. This improves the design of the actuator 1500 in several ways. Combining the components would allow the bearing races to be near the output face of the actuator 1500, which would increase the moment carrying capacity of the actuator 1500. This would also reduce component count, simplify the overall assembly, and reduce the inertia of the actuator 1500.

Figure 16:
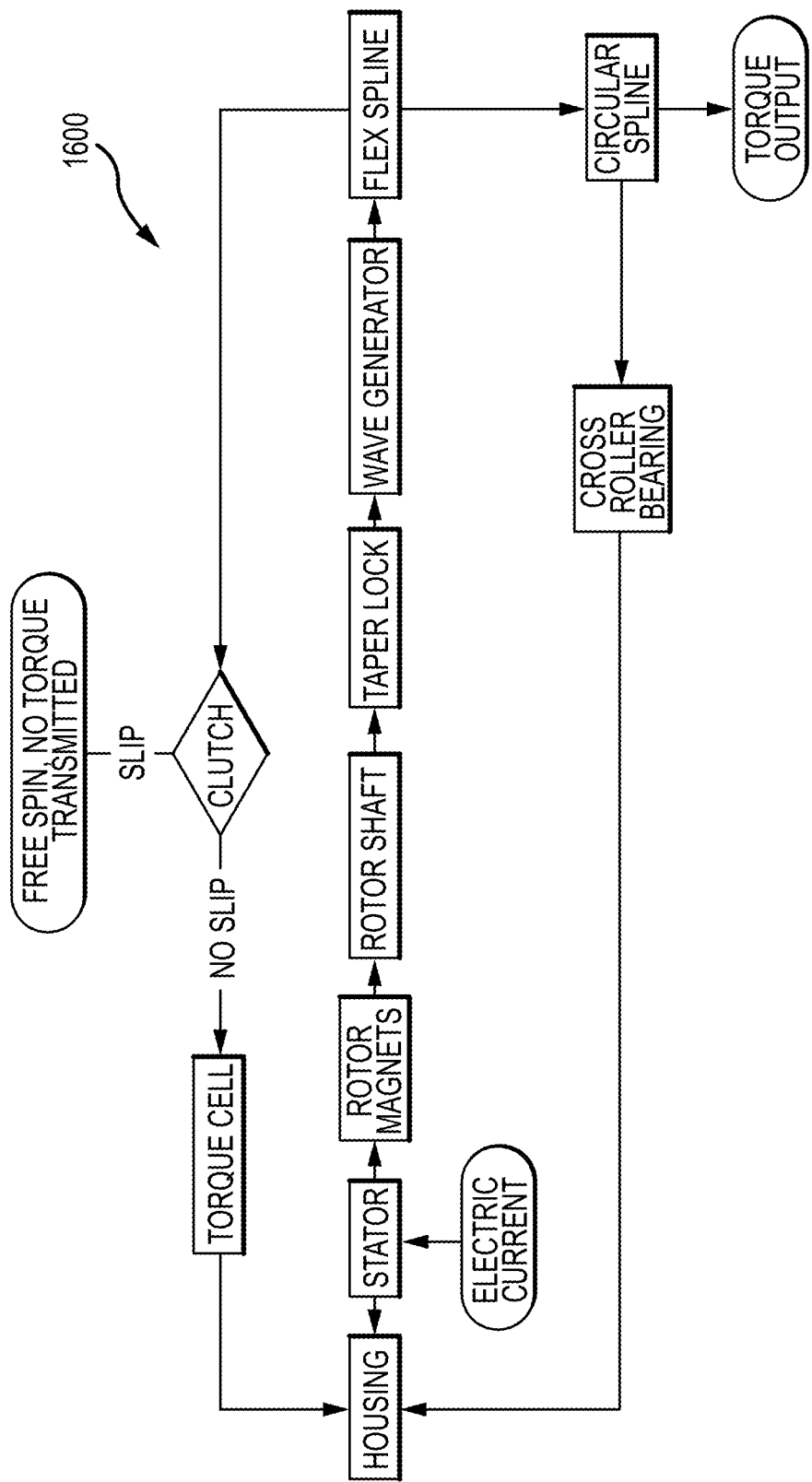
FIG. 16 is a diagram showing the path of torque through the actuator of FIG. 15 during its operations/use.
Figure 17:
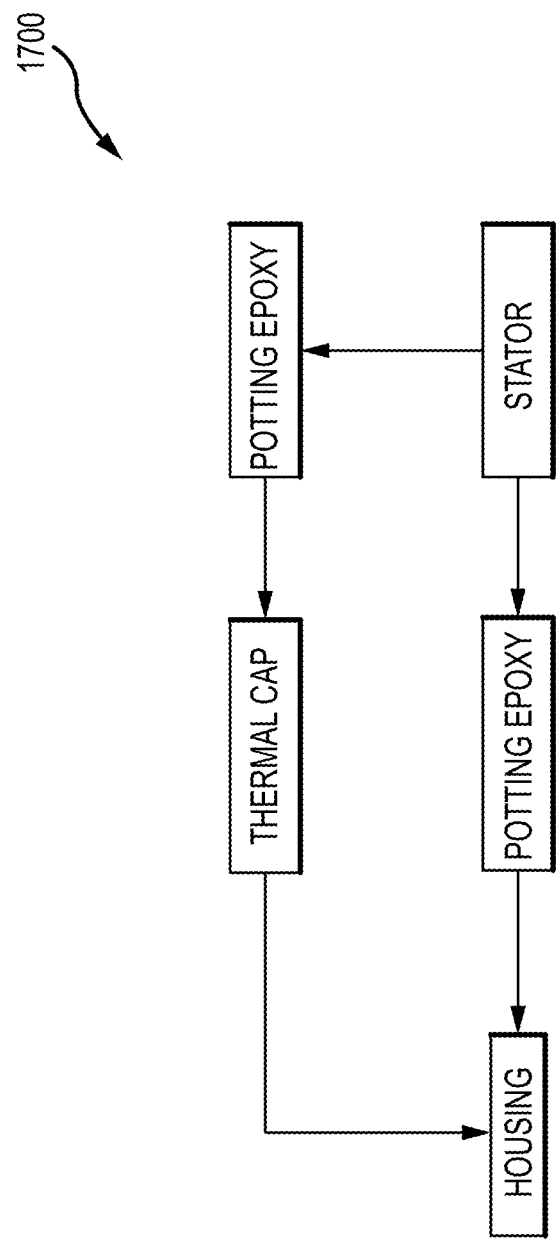
FIG. 17 is a diagram showing path of heat dissipation through the actuator.

FIG. 16 is a torque diagram 1600 showing the path of torque through the actuator 1500 generated during use and/or operations with the actuator 1500 (such as in the thigh structure described above). FIG. 17 is a diagram 1700 showing path of heat dissipation through the actuator 1500 during its use. All heat generated in the stator 1502 and is dissipated to the housing 1501. Thermal management is useful as the more efficient the thermal management, the higher the continuous torque rating of the actuator 1500.

At this point in the description, it may be useful to turn to the animation (or robot control data) toolchain and workflow and problems addressed and resolved by the new robot design system and method. The problems or challenges include those in attempting to animate a balancing robot versus a fixed-base robotic device. Authoring animation for a free ranging robot that needs to balance on its own adds several challenges when compared to working with fixed-base robot. Extreme attention has to be paid to balance. A simple body lean or head turn, even with both feet planted on the floor, can move the center of pressure into an infeasible position. Another challenge is dynamic versus static analysis of motion. In a fixed-base figure, the animator can examine speed plots of each function. As long as the speeds and torques at each and every frame are acceptable, the animation will likely play on hardware. For a balancing figure, the animator needs to consider what comes next, how the figure will respond and recover from the momentum they create whey authoring movement. This requires using a simulation tool to analyze animations and a good intuitive understanding of the physics involved.

Another challenge in animation is the volume of animation needed for a performance. Observers are not passing the robot actor in a vehicle for a few seconds. Observers and interacting people are expected to spend time with the robot actor for several minutes, from a possible 360-degree circle of vantage points. Caricatured physics is another challenging part of animation. Through analysis in simulation, the inventors have discovered that most animated character walks that audiences have been watching on screen for the past hundred years are dynamically infeasible. The animator, therefore, has to find a way to express creative intent while obeying physical constraints.

Figure 18:
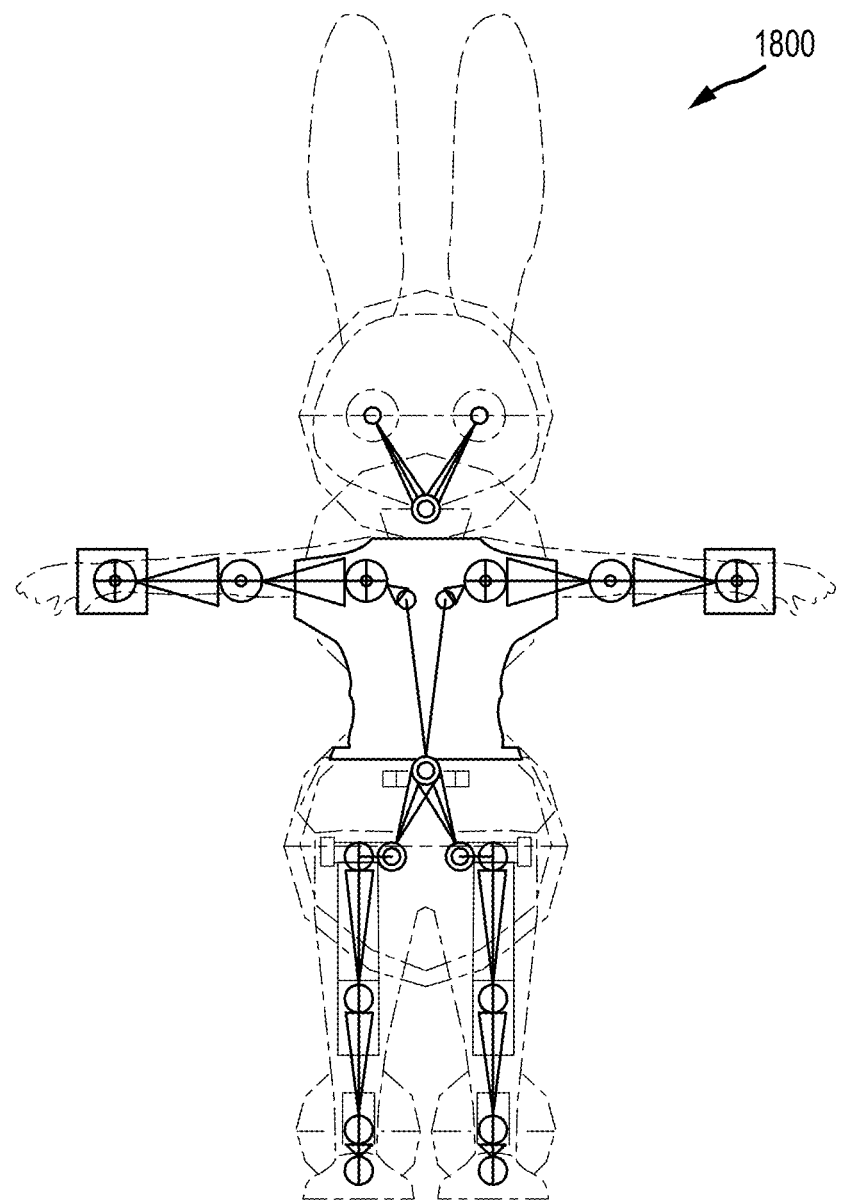
FIG. 18 illustrates a screenshot of an animation rig for an exemplary character intended to be acted out or performed by a particular robot actor design.

Regarding the animation authoring environment, the inventors created an animation rig (e.g., a Maya animation rig) that looks and behaves like an ordinary CG humanoid rig, but it is adapted to provide live feedback on whether the animation obeys key physical limitations. FIG. 18 illustrates a screenshot 1800 of an animation rig for an exemplary character intended to be acted out or performed by a particular robot actor design. By providing feedback, the animators can author performances for the robot actor in a virtual environment they are already familiar with.

The rig shown in screenshot 1800 provides feedback on range of motion, joint velocity, and foot slip. With regard to range of motion, joints rotations are range limited and will not exceed set limits. A link will turn yellow (or otherwise provide a visual and/or audio indication) when the animator reaches that limit so that clipping can be avoided. Regarding joint velocity, a link will turn red (or, again, provide another visual and/or audio indication) when its angular velocity exceeds a preset maximum such as 10 rad/s. As to foot slip, the foot turns blue (or otherwise provides a visual and/or audio indication) when there is a discrepancy of more than a preset maximum limit such as 0.1 mm between the desired and actual foot position and the foot is in a positive ground contact state.

The animation rig may use low-poly mesh exports, such as from Solidworks CAD models, and the CG character model meshes attached to a skeletal joint rig. The mechanism and the character silhouette are both visible to the animator. General purpose inverse kinematics solvers included with animation software are often inadequate for representing real mechanical systems. Common practices in rigging for robotics are either to solve the IK with a proprietary plugin or to approximate it for the animator and calculate the real solution in the controls software. Neither approach met the inventors' needs or goals, which required that the animator see an accurate representation of the mechanism. Also, the animation rig shown in FIG. 18 preferably functions in off-the-shelf animation software (such as Maya) so it can be deployed on a render farm without installing special plugins on potentially hundreds of render nodes.

Figure 19:
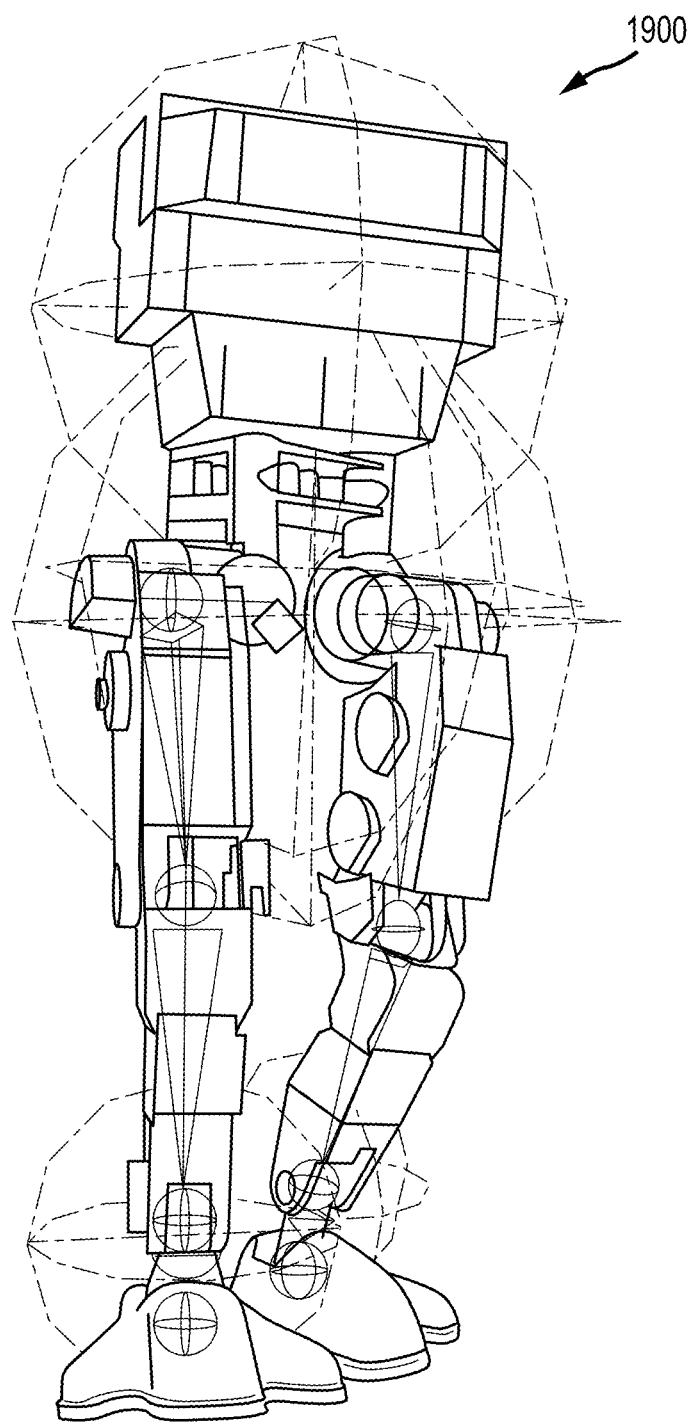
FIG. 19 illustrates a second screenshot showing an animation rig of the legs of a robot actor while an animator is defining the leg pose with inverse kinematics control.

FIG. 19 illustrates another screenshot 1900 showing an animation rig of the legs of a robot while an animator is defining the leg pose with inverse kinematics control. For the legs, the animator sets a desired position and orientation for the pelvis and the feet. Given these constraints, there is only one valid solution for the joint angles of the leg. The solution is calculated using simple trigonometry, animation software (such as Maya) aim and orientation constraints, and animation software (such as Maya) single-chain IK solver.

Figure 20:
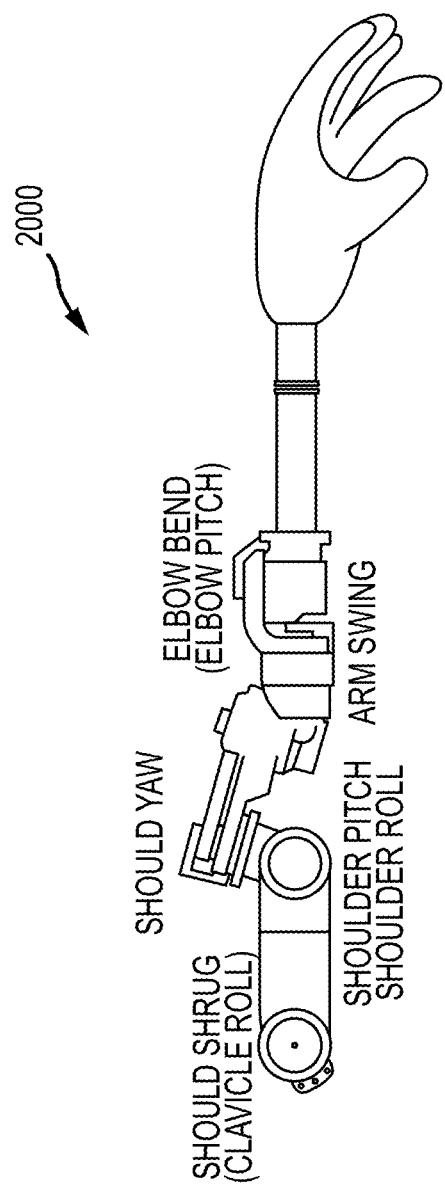
FIG. 20 illustrates a diagram of a four-axis shoulder of a robot actor that may be displayed in an animator GUI.

Similar animation assist may be provided for other portions of the particular robot actor and its playing of a chosen character. For example, FIG. 20 illustrates a diagram 2000 of a four-axis shoulder that may be displayed in an animator GUI as discussed for FIGS. 18 and 19. The inventors have developed an inverse kinematic solver that maps standard 3-axis animator input (x, y, z rotations) onto the 4-axis shoulder mechanism. The mechanism is a universal joint (2 bend functions) with twist functions on both ends. Given a known Cartesian position on the elbow, the first twist angle is determined by a non-linear function that maximizes the available ROM and minimizes velocity requirements for the U joint to point at the elbow position. After the two bend functions in the U joint are used to resolve the elbow position, the second twist function rotates to point the forearm to a known wrist position.

Figure 21:
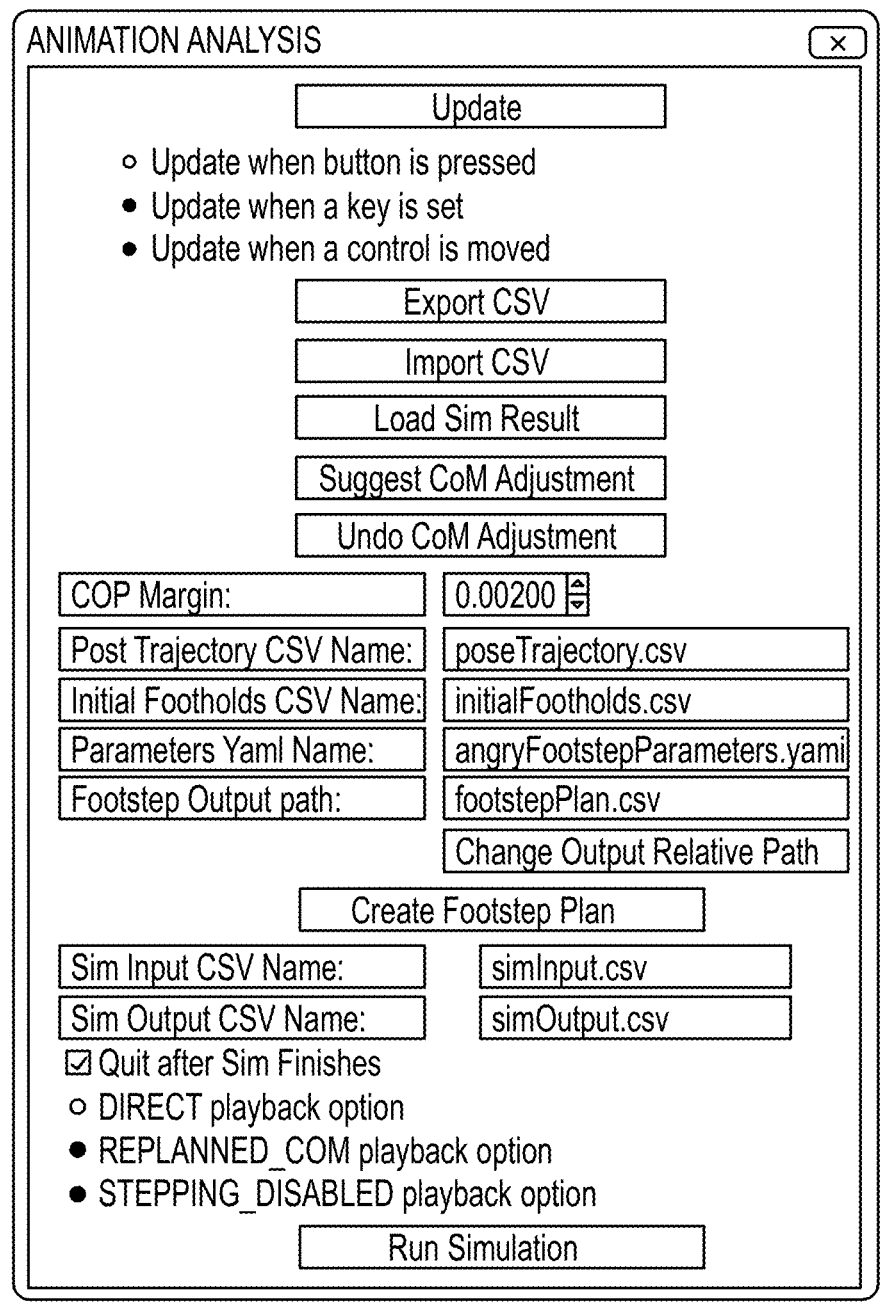
FIG. 21 is a screenshot of an interface to an animation analysis plugin of the present description.

FIG. 21 provides a screenshot 2100 of an exemplary interface to an animation assist application or plugin (to an animation software package such as Maya). The animation plugin is the tool that links the authoring software described herein with the simulation environment. It has the following functionality: (1) allows the animator to visualize the robot actor's center of pressure (COP) on the ground plane and an area on the ground plane were the COP can reside without the robot falling over (support polygon); (2) exports joint angle data and foot ground contact states (e.g., in .csv format, which can be imported into simulation); (3) imports joint angle data (e.g., .csv joint angle data) to view a simulation result in the animation software (e.g., Maya); (4) provides a footstep planner, which generates a map of suggested footholds based on an animated body trajectory and swing/transfer time parameters; and (5) provides an animation verifier, which performs a final pre-export check for joint velocity overspeed, foot slip, ROM violations, and angular momentum.

Figure 22B:
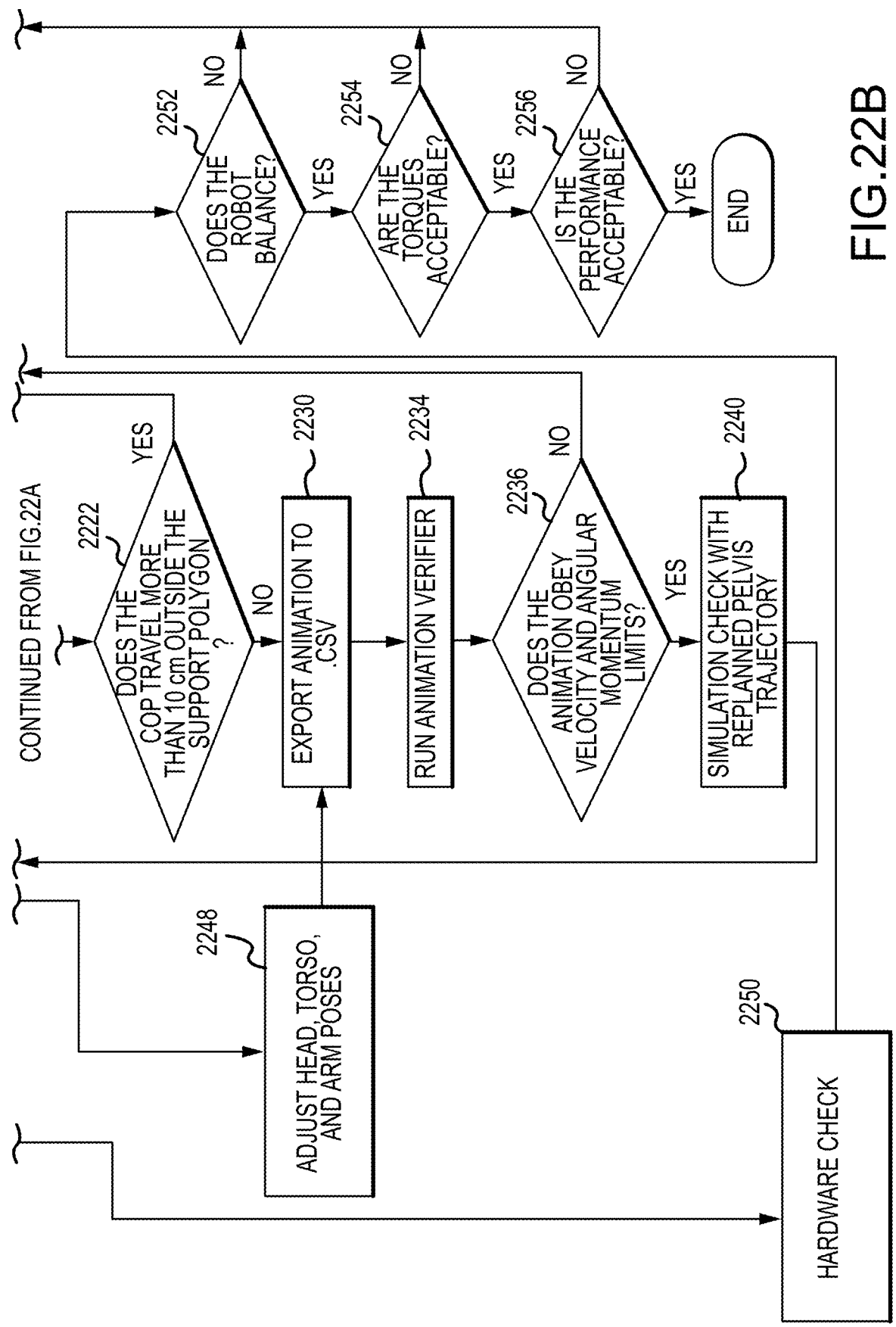

FIGS. 22A and 22B provide a flow diagram 2200 illustrating the workflow currently proposed and used by the inventors to animate a robot actor. The method 2200 includes animating the performance at 2210. A skeletal rig is used to create the animation data. It looks and behaves like an ordinary CG rig, but it has added tools to make the process easier for intended use. These tools include (but are not limited to) a footstep planner and live feedback for ROM, foot slip, and velocity violations, as shown at steps 2212 and 2214.

The next step, at 2220, is a preliminary COP check using the animation plugin. If the center of pressure travels more than a predefined amount (such as 10 cm) outside of the support polygon as determined at 2222, it will require a drastic pelvis trajectory correction. These extreme changes may be impossible with the available range of motion and will likely not satisfy the animator's creative intent. In these cases, foot placement and upper body tilt are adjusted at 2226 such that the pelvis trajectory easier to correct in simulation.

Then, the joint angle data is exported to a .csv file using the animation plugin as shown at steps 2230. In step 2234, the .csv file is run through the animation verifier tool, which gives a final check on footslip, ROM, and velocity violations and, significantly, checks for angular momentum. The swing foot creates angular momentum that is balanced by a counter-rotation of the upper body or, if not, the robot would be likely to fall over in a single support. Unbalanced upper body rotations can create a similar problem.

Next, when the exported animation has passed the animation verifier check at 2236 (with a check on whether the animation obeys velocity and angular momentum limits), it is ready to be loaded into the simulation tool as shown at steps 2240, 2242 for a go/no-go balance check and for re-planning of the horizontal pelvis trajectory. Animators have a snapshot of the simulator build on their local workstations to perform this check. The animated X and Y movement of the pelvis is discarded and recalculated in such a way that the robot actor is able to balance. It has been found by the inventors that there are enough constraints given by the full body animation that the performance usually survives this step 2240, 2242 intact.

The joint angles are then, at 2244, imported from simulation back into Maya as .csv data using the animation plugin. At 2246, the full body performance is checked to see if it is still acceptable given the re-planned pelvis trajectory. At this stage as shown at step 2248, torso and head rotations may need to be updated to maintain the character's facing direction, and the arm animations may require adjustment to prevent collision with the lower body.

After passing the simulation check, the method 2200 continues at 2250 with a test on hardware. Examining the desired versus the actual pelvis and swing foot trajectories, as well as the torque plots for the legs, is very helpful for diagnosing problems at this stage. If at 2252 the hardware/robot does not balance, the method 2200 continues at 2210 with the animator being able to make corrections to the animated or scripted performance. If at 2254 the hardware/robot experiences unacceptable torques, the animator also has the opportunity at 2210 to modify the animated or scripted performance. If at 2256 the hardware/robot does not have acceptable performance, the method 2200 continues at 2210 with the animator being able to make corrections to the animated or scripted performance.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A robot for bringing characters to life in the physical world, comprising:
 movable components;
 memory storing a set of animations, motion parameters, or scripts defining a set of gestures and a set of movements for each of a plurality of moods or emotions, wherein the set of animations or scripts are generated based on one of the characters; and
 a controller located onboard the robot,
 wherein the robot is untethered and free-ranging in a physical space,
 wherein the controller determines, in real time, a present mood or emotion associated with the robot,
 wherein the controller selects one of the sets of gestures or one of the sets of movements based on the present mood or emotion,
 wherein the controller operates a set of actuators to operate the movable components using the selected one of the sets of gestures or the sets of movements, whereby the robot is operated to provide an illusion of life, wherein the movable components comprise two or more legs each comprising an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, and wherein a stack of spaced apart metal fins are positioned within the hollow interior space that are coupled to sidewalls defining the channels and that define air plenums for air between the air inlets and the air outlets.

2. The robot of claim 1, further comprising sensors for sensing input from the physical space and wherein the controller processes the input from the physical space to determine the present mood or emotion.

3. The robot of claim 1, wherein the controller operates the sets of actuators by sequentially selecting, in real time, differing ones of the sets of gestures or the sets of movements to provide motion synthesis for the robot while maintaining balance in the physical space.

4. The robot of claim 3, wherein the controller generates, in real time, transitional movements and control signals for the set of actuators between each sequential pair of the sets of gestures or the sets of movements.

5. The robot of claim 1, wherein the sidewalls defining the channels each provides a housing for one of the actuators received in the upper leg housing.

6. The robot of claim 1, wherein the movable components comprise two or more legs each comprising an upper leg housing and a lower leg housing coupled via a knee joint, wherein the upper leg housing includes sidewalls defining a hollow interior space, wherein channels are provided in the upper leg housing for receiving two or more of the actuators including an ankle pitch actuator, and wherein two belts extend from the upper leg housing and the ankle pitch actuator over a pulley in the lower leg housing with a configuration that transmits torque of the ankle pitch actuator across the knee joint to provide assistive torque during stance using reversed gastrocnemius.

7. The robot of claim 1, wherein at least a subset of the actuators each includes a clutch acting as a self-resetting mechanical fuse when transient torques exceed actuator component limits to handle impact events.

8. A method of generating control animations, motion parameters, or scripts for a self-balancing, legged robot, comprising:

animating a performance for a legged robot with a predefined hardware configuration;

verifying whether the animated performance complies with physical constraints, wherein when the animated performance is noncompliant with the physical constraints the animating is repeated; and running a simulation of the animated performance based on the predefined hardware configuration to determine whether the legged robot balances, wherein the animating is repeated when the legged robot loses balance during the running of the simulation.

9. The method of claim 8, wherein the physical constraints are verified by checking at least one of joint velocity overspeed, foot slip, ROM violations, angular momentum, and COP within a support polygon.

10. The method of claim 8, wherein the animating the performance comprises processing an input path for the legged robot to automatically generate a set of footsteps for the legged robot and further comprises receiving user input modifying the set of footsteps for the legged robot to define the animated performance.

11. The method of claim 8, further including, prior to the running the simulation, automatically correcting a pelvis trajectory of the legged robot, and wherein the method further comprises displaying results of the simulation with the corrected pelvis trajectory, receiving user input indicating whether performance by the legged robot is acceptable, and exporting, in response to the user input indicating an unacceptable performance, the animated performance with the corrected pelvis trajectory.

12. The method of claim 8, further comprising performing a hardware check by operating the legged robot to perform the animated performance, wherein the hardware check includes determining whether the legged robot retains balance and whether generated torques in actuators in the legged robot are acceptable.

13. A robot for bringing characters to life in the physical world, comprising:

a pair of movable legs;

memory storing authored animation content generated to correspond with a screen-based character;

sensors perceiving inputs from a physical environment in which the robot is positioned; and a controller including a behavior engine processing the authored animation content along with the inputs from the sensors to generate motion commands to control motion of the pair of movable legs, wherein the controller performs motion synthesis prior to generating the motion commands, wherein the behavior engine selects and places in sequential order a set of movements in the authored animation content based on the inputs from the sensors, wherein a set of actuators in the pair of legs operate in response to the motion commands, wherein the legs each comprise an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, and wherein a stack of spaced apart metal fins are positioned within the hollow interior space that are coupled to sidewalls defining the channels and that define air plenums for air between the air inlets and the air outlets.

14. The robot of claim 13, wherein the motion synthesis includes generating transitional movements between one or more of sequential pairs of the selected and ordered set of movements.

15. The robot of claim 13, wherein the sidewalls defining the channels each provides a housing for one of the actuators received in the upper leg housing.

16. The robot of claim 13, wherein the legs each comprise an upper leg housing and a lower leg housing coupled via a knee joint, wherein the upper leg housing includes sidewalls defining a hollow interior space, wherein channels are provided in the upper leg housing for receiving two or more of the actuators including an ankle pitch actuator, and wherein two belts extend from the upper leg housing and the ankle pitch actuator over a pulley in the lower leg housing with a configuration that transmits torque of the ankle pitch actuator across the knee joint to provide assistive torque during stance using reversed gastrocnemius.

17. The robot of claim 13, wherein at least a subset of the actuators each includes a clutch acting as a self-resetting mechanical fuse when transient torques exceed actuator component limits to handle impact events.

18. A robot for bringing characters to life in the physical world, comprising:
movable components;
memory storing a set of animations, motion parameters, or scripts defining a set of gestures and a set of movements for each of a plurality of moods or emotions, wherein the set of animations or scripts are generated based on one of the characters; and
a controller located onboard the robot,
wherein the robot is untethered and free-ranging in a physical space,
wherein the controller determines, in real time, a present mood or emotion associated with the robot,
wherein the controller selects one of the sets of gestures or one of the sets of movements based on the present mood or emotion,
wherein the controller operates a set of actuators to operate the movable components using the selected one of the sets of gestures or the sets of movements, whereby the robot is operated to provide an illusion of life,
wherein the movable components comprise two or more legs each comprising an upper leg housing and a lower leg housing coupled via a knee joint,
wherein the upper leg housing includes sidewalls defining a hollow interior space,
wherein channels are provided in the upper leg housing for receiving two or more of the actuators including an ankle pitch actuator, and
wherein two belts extend from the upper leg housing and the ankle pitch actuator over a pulley in the lower leg housing with a configuration that transmits torque of the ankle pitch actuator across the knee joint to provide assistive torque during stance using reversed gastrocnemius.

19. The robot of claim 18, further comprising sensors for sensing input from the physical space and wherein the controller processes the input from the physical space to determine the present mood or emotion.

20. The robot of claim 18, wherein the controller operates the sets of actuators by sequentially selecting, in real time, differing ones of the sets of gestures or the sets of movements to provide motion synthesis for the robot while maintaining balance in the physical space.

21. The robot of claim 20, wherein the controller generates, in real time, transitional movements and control signals for the set of actuators between each sequential pair of the sets of gestures or the sets of movements.

22. The robot of claim 18, wherein the movable components comprise two or more legs each comprising an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, wherein a stack of spaced apart metal fins are positioned within the hollow interior space that are coupled to sidewalls defining the channels and that define air plenums for air between the air inlets and the air outlets, and wherein the sidewalls defining the channels each provides a housing for one of the actuators received in the upper leg housing.

23. The robot of claim 18, wherein at least a subset of the actuators each includes a clutch acting as a self-resetting mechanical fuse when transient torques exceed actuator component limits to handle impact events.

24. A robot for bringing characters to life in the physical world, comprising:
movable components;
memory storing a set of animations, motion parameters, or scripts defining a set of gestures and a set of movements for each of a plurality of moods or emotions, wherein the set of animations or scripts are generated based on one of the characters; and
a controller located onboard the robot,
wherein the robot is untethered and free-ranging in a physical space,
wherein the controller determines, in real time, a present mood or emotion associated with the robot,
wherein the controller selects one of the sets of gestures or one of the sets of movements based on the present mood or emotion,
wherein the controller operates a set of actuators to operate the movable components using the selected one of the sets of gestures or the sets of movements, whereby the robot is operated to provide an illusion of life, and
wherein at least a subset of the actuators each includes a clutch acting as a self-resetting mechanical fuse when transient torques exceed actuator component limits to handle impact events.

25. The robot of claim 24, further comprising sensors for sensing input from the physical space and wherein the controller processes the input from the physical space to determine the present mood or emotion.

26. The robot of claim 24, wherein the controller operates the sets of actuators by sequentially selecting, in real time, differing ones of the sets of gestures or the sets of movements to provide motion synthesis for the robot while maintaining balance in the physical space.

27. The robot of claim 26, wherein the controller generates, in real time, transitional movements and control signals for the set of actuators between each sequential pair of the sets of gestures or the sets of movements.

28. The robot of claim 24, wherein the movable components comprise two or more legs each comprising an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, wherein a stack of spaced apart metal fins are positioned within the hollow interior space that are coupled to sidewalls defining the channels and that define air plenums for air between the air inlets and the air outlets, and wherein the sidewalls defining the channels each provides a housing for one of the actuators received in the upper leg housing.

29. A robot for bringing characters to life in the physical world, comprising:
- a pair of movable legs;
- memory storing authored animation content generated to correspond with a screen-based character;
- sensors perceiving inputs from a physical environment in which the robot is positioned; and
- a controller including a behavior engine processing the authored animation content along with the inputs from the sensors to generate motion commands to control motion of the pair of movable legs,
- wherein the controller performs motion synthesis prior to generating the motion commands,
- wherein the behavior engine selects and places in sequential order a set of movements in the authored animation content based on the inputs from the sensors,
- wherein a set of actuators in the pair of legs operate in response to the motion commands,
- wherein the legs each comprise an upper leg housing and a lower leg housing coupled via a knee joint,
- wherein the upper leg housing includes sidewalls defining a hollow interior space,
- wherein channels are provided in the upper leg housing for receiving two or more of the actuators including an ankle pitch actuator, and
- wherein two belts extend from the upper leg housing and the ankle pitch actuator over a pulley in the lower leg housing with a configuration that transmits torque of the ankle pitch actuator across the knee joint to provide assistive torque during stance using reversed gastrocnemius.

30. The robot of claim 29, wherein the motion synthesis includes generating transitional movements between one or more of sequential pairs of the selected and ordered set of movements.

31. The robot of claim 29, wherein the legs each comprise an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, wherein a stack of spaced apart metal fins are positioned within the hollow interior space that are coupled to sidewalls defining the channels and that define air plenums for air between the air inlets and the air outlets, and wherein the sidewalls defining the channels each provides a housing for one of the actuators received in the upper leg housing.

32. The robot of claim 29, wherein at least a subset of the actuators each includes a clutch acting as a self-resetting mechanical fuse when transient torques exceed actuator component limits to handle impact events.

33. A robot for bringing characters to life in the physical world, comprising:
- a pair of movable legs;
- memory storing authored animation content generated to correspond with a screen-based character;
- sensors perceiving inputs from a physical environment in which the robot is positioned; and
- a controller including a behavior engine processing the authored animation content along with the inputs from the sensors to generate motion commands to control motion of the pair of movable legs,
- wherein the controller performs motion synthesis prior to generating the motion commands,
- wherein the behavior engine selects and places in sequential order a set of movements in the authored animation content based on the inputs from the sensors,
- wherein a set of actuators in the pair of legs operate in response to the motion commands, and
- wherein at least a subset of the actuators each includes a clutch acting as a self-resetting mechanical fuse when transient torques exceed actuator component limits to handle impact events.

34. The robot of claim 33, wherein the motion synthesis includes generating transitional movements between one or more of sequential pairs of the selected and ordered set of movements.

35. The robot of claim 33, wherein the legs each comprise an upper leg housing and a lower leg housing coupled via a knee joint, wherein the upper leg housing includes sidewalls defining a hollow interior space, wherein channels are provided in the upper leg housing for receiving two or more of the actuators, wherein the sidewalls include air inlets for drawing air into the hollow interior space and air outlets for exhausting air out of the hollow interior space, wherein a stack of spaced apart metal fins are positioned within the hollow interior space that are coupled to sidewalls defining the channels and that define air plenums for air between the air inlets and the air outlets, and wherein the sidewalls defining the channels each provides a housing for one of the actuators received in the upper leg housing.

* * * * *